US012615106B2

(12) United States Patent  
Turner et al.

(10) Patent No.: US 12,615,106 B2  
(45) Date of Patent: Apr. 28, 2026

(54) TECHNIQUES FOR DYNAMICALLY ADJUSTING RETRANSMISSION OPPORTUNITIES WITHIN A CONNECTED ISOCHRONOUS STREAM

(71) Applicant: QUALCOMM Incorporated, San Diego, CA (US)

(72) Inventors: Richard Turner, Belfast (GB); Douglas Kogan, Bend, OR (US); Laurent Wojcieszak, Belfast (GB); Mayank Batra, Cambridge (GB); Vishal Agarwal, Bangalore (IN)

(73) Assignee: QUALCOMM Incorporated, San Diego, CA (US)

( * ) Notice: Subject to any disclaimer, the term of this patent is extended or adjusted under 35 U.S.C. 154(b) by 631 days.

(21) Appl. No.: 17/949,032

(22) Filed: Sep. 20, 2022

(65) Prior Publication Data

US 2024/0097824 A1 Mar. 21, 2024

(51) Int. Cl.
*H04L 1/08* (2006.01)
*H04W 72/54* (2023.01)
(Continued)

(52) U.S. Cl.
CPC .............. *H04L 1/08* (2013.01); *H04W 72/54* (2023.01); *H04L 1/00* (2013.01); *H04L 1/16* (2013.01);
(Continued)

(58) Field of Classification Search
CPC ..... H04L 1/08; H04L 1/00; H04L 1/16; H04L 1/18; H04L 1/1812; H04L 1/1825;
(Continued)

(56) References Cited

U.S. PATENT DOCUMENTS 7,958,341 B1 * 6/2011 Cismas ................. G06F 15/167
710/316
10,154,515 B1 * 12/2018 Oroskar ................ H04L 1/0003
(Continued)

FOREIGN PATENT DOCUMENTS

CN 113922920 A * 1/2022 ............. H04L 1/188

OTHER PUBLICATIONS

English Translation of Foreign Application (CN-113922920-A) downloaded from IP.com on Feb. 2025 (Year: 2025).*
(Continued)

*Primary Examiner* — Ayman A Abaza
(74) *Attorney, Agent, or Firm* — Holland & Hart LLP

(57) ABSTRACT

Methods, systems, and devices for techniques for dynamically adjusting retransmission opportunities within a connected isochronous stream (CIS) are described. In some aspects, a first wireless device and a second wireless device may support one or more dynamic or "on-the-fly" adjustments to one or more CIS settings in accordance with a link quality between the first wireless device and the second wireless device. For example, the first wireless device and the second wireless device may tie a number of transmission opportunities that are usable for retransmissions, within a given isochronous (ISO) interval, to the link quality between the first wireless device and the second wireless device. The link quality may be tied or associated with a modulation and coding scheme (MCS) of the link. As such, the first wireless device and the second wireless device may tie a dynamic change in MCS to a dynamic change in retransmission opportunities.

27 Claims, 11 Drawing Sheets

(51) Int. Cl.

| | |
|---|---|
| *H04L 1/00* | (2006.01) |
| *H04L 1/16* | (2023.01) |
| *H04L 1/18* | (2023.01) |
| *H04L 1/1812* | (2023.01) |
| *H04L 1/1825* | (2023.01) |
| *H04L 1/22* | (2006.01) |
| *H04W 72/04* | (2023.01) |
| *H04W 72/20* | (2023.01) |

(52) U.S. Cl.
CPC .............. *H04L 1/18* (2013.01); *H04L 1/1812* (2013.01); *H04L 1/1825* (2013.01); *H04L 1/22* (2013.01); *H04W 72/04* (2013.01); *H04W 72/20* (2023.01)

(58) Field of Classification Search
CPC ........ H04L 1/22; H04L 1/1887; H04W 72/54; H04W 72/04; H04W 72/20
See application file for complete search history.

(56) References Cited

U.S. PATENT DOCUMENTS

| | | | | |
|---|---|---|---|---|
| 2010/0290559 A1* | 11/2010 | Futagi | .................. | H04L 1/0016 |
| | | | | 375/295 |
| 2017/0086081 A1* | 3/2017 | Kim | ...................... | H04W 4/027 |
| 2017/0251469 A1* | 8/2017 | Lee | ................... | H04W 72/0446 |
| 2018/0295516 A1* | 10/2018 | Chen | ..................... | H04L 9/0861 |
| 2020/0252162 A1* | 8/2020 | Denboer | .............. | H04L 69/324 |
| 2021/0013990 A1* | 1/2021 | Chen | ......................... | H04L 1/16 |
| 2021/0306103 A1 | 9/2021 | Young et al. | | |
| 2022/0046433 A1* | 2/2022 | Bedekar | ............... | H04W 76/10 |
| 2022/0103287 A1* | 3/2022 | Son | ...................... | H04W 72/20 |
| 2023/0085423 A1* | 3/2023 | Kubo | ................... | H04W 28/04 |
| | | | | 370/230 |

OTHER PUBLICATIONS

International Search Report and Written Opinion—PCT/US2023/032297—ISA/EPO—Dec. 18, 2023.

* cited by examiner

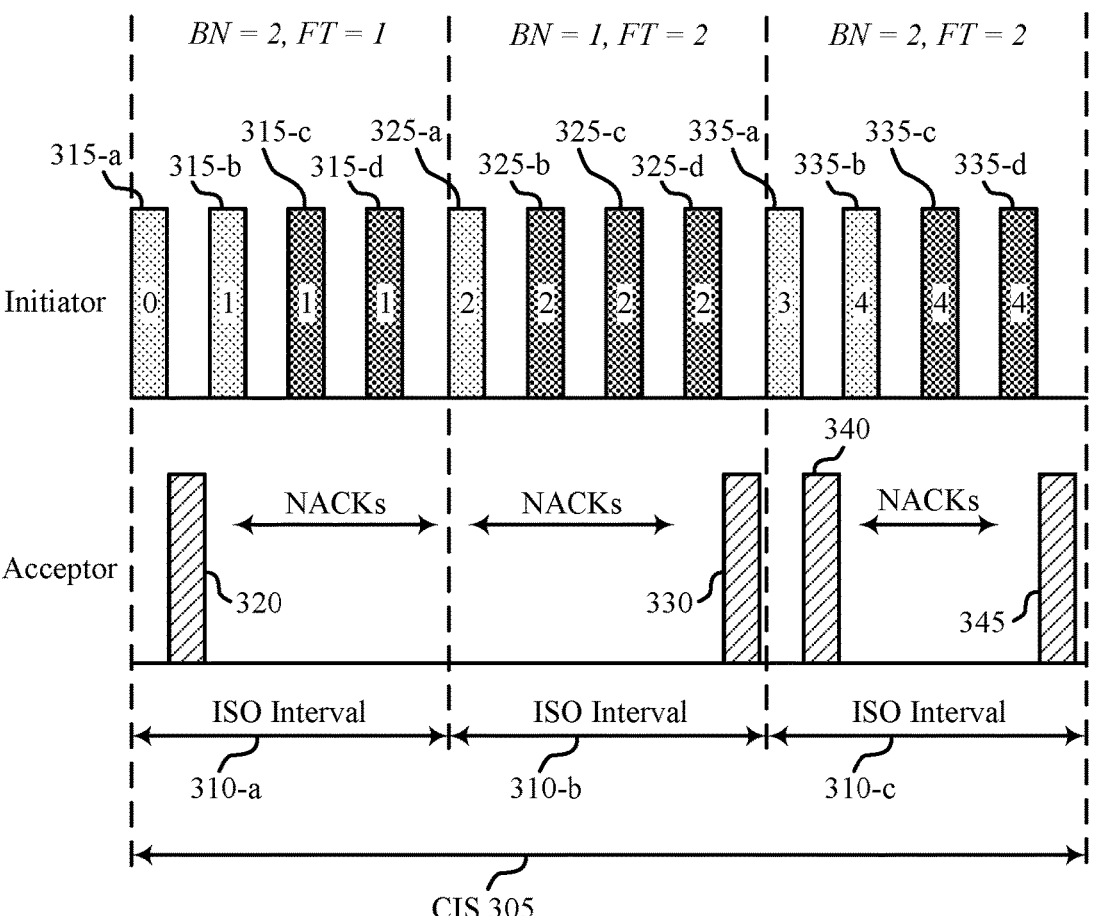
FIG. 3

Figure 5:
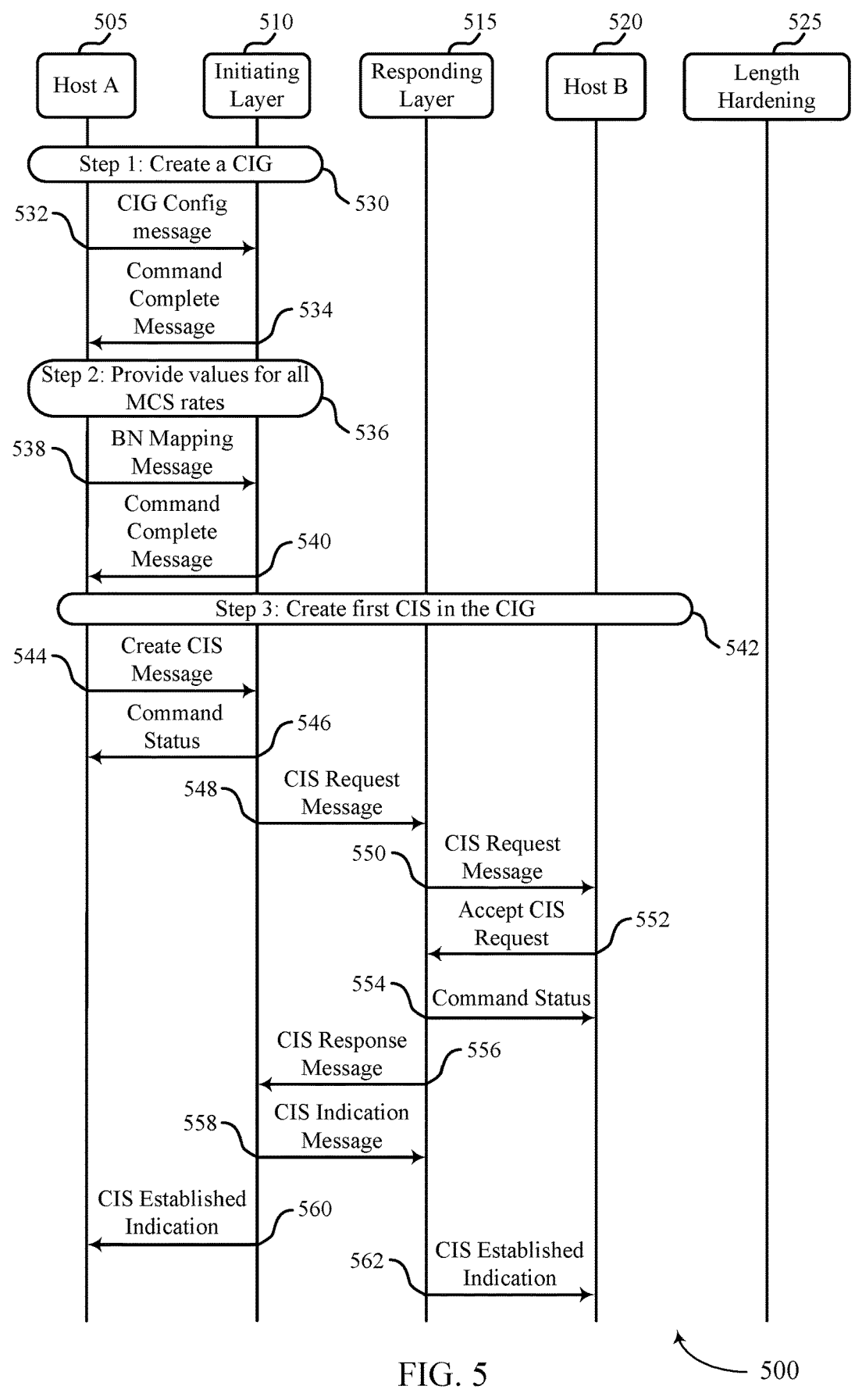

505     510     515     520     525

| Host A | Initiating Layer | Responding Layer | Host B | Length Hardening |

Step 1: Create a CIG — 530

532 — CIG Config message

Command Complete Message — 534

Step 2: Provide values for all MCS rates — 536

538 — BN Mapping Message

Command Complete Message — 540

Step 3: Create first CIS in the CIG — 542

544 — Create CIS Message

Command Status — 546

548 — CIS Request Message

550 — CIS Request Message

Accept CIS Request — 552

554 — Command Status

CIS Response Message — 556

558 — CIS Indication Message

CIS Established Indication — 560

562 — CIS Established Indication

FIG. 5 — 500

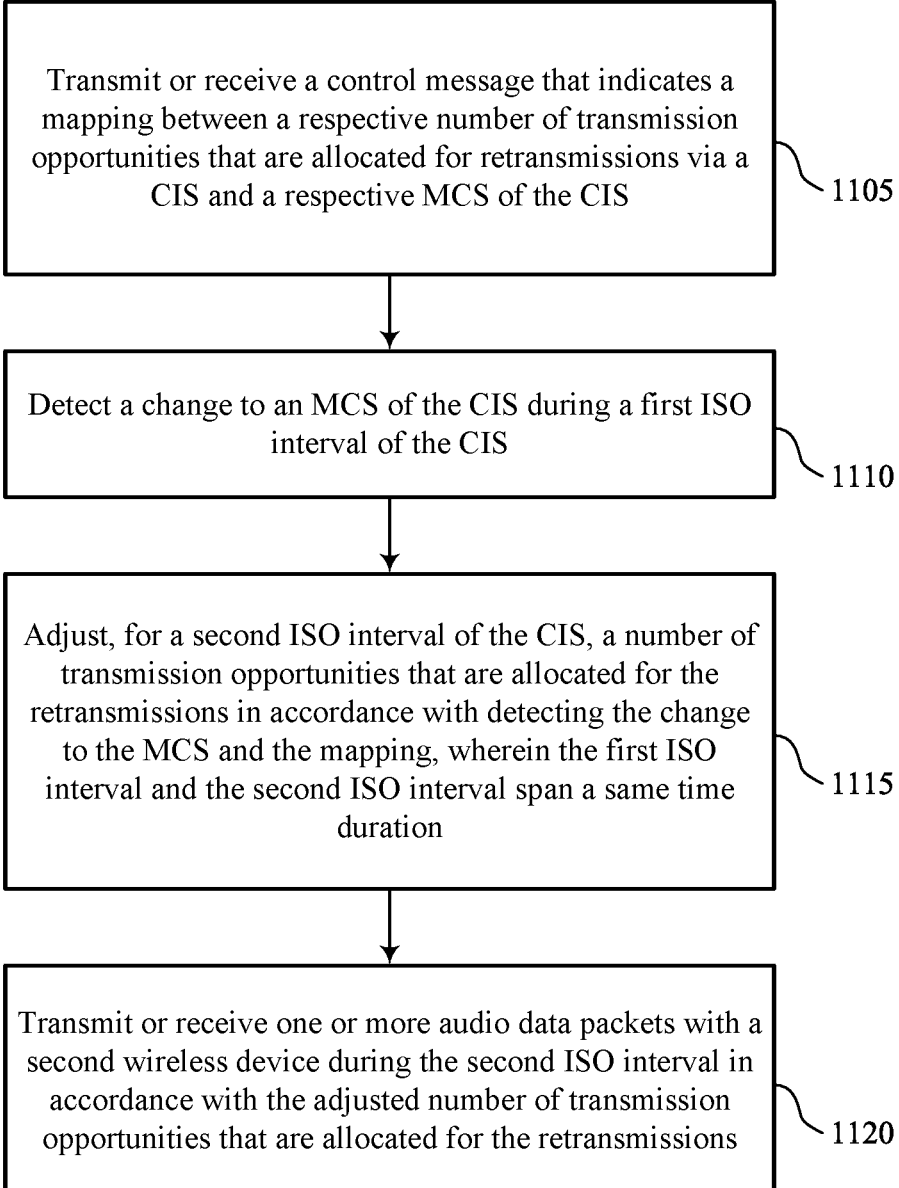

Transmit or receive a control message that indicates a mapping between a respective number of transmission opportunities that are allocated for retransmissions via a CIS and a respective MCS of the CIS

1105

Detect a change to an MCS of the CIS during a first ISO interval of the CIS

1110

Adjust, for a second ISO interval of the CIS, a number of transmission opportunities that are allocated for the retransmissions in accordance with detecting the change to the MCS and the mapping, wherein the first ISO interval and the second ISO interval span a same time duration

1115

Transmit or receive one or more audio data packets with a second wireless device during the second ISO interval in accordance with the adjusted number of transmission opportunities that are allocated for the retransmissions

TECHNIQUES FOR DYNAMICALLY ADJUSTING RETRANSMISSION OPPORTUNITIES WITHIN A CONNECTED ISOCHRONOUS STREAM

BACKGROUND

The following relates to wireless communications, including techniques for dynamically adjusting retransmission opportunities within a connected isochronous stream (CIS).

Wireless communications systems are widely deployed to provide various types of communication content such as voice, video, packet data, messaging, broadcast, and so on. These systems may be multiple-access systems capable of supporting communication with multiple users by sharing the available system resources (e.g., time, frequency, and power). A wireless network, for example a wireless local area network (WLAN), such as a Wi-Fi (i.e., Institute of Electrical and Electronics Engineers (IEEE) 802.11) network may include an access point (AP) that may communicate with one or more wireless or mobile devices. The AP may be coupled to a network, such as the Internet, and may enable a mobile device to communicate via the network (or communicate with other devices coupled to the access point). A wireless device may communicate with a network device bi-directionally. For example, in a WLAN, a device may communicate with an associated AP via downlink (e.g., the communication link from the AP to the device) and uplink (e.g., the communication link from the device to the AP). A wireless personal area network (PAN), which may include a Bluetooth connection, may provide for short range wireless connections between two or more paired wireless devices. For example, wireless devices such as cellular phones may utilize wireless PAN communications to exchange information such as audio signals with wireless headsets.

SUMMARY

The described techniques relate to improved methods, systems, devices, and apparatuses that support techniques for dynamically adjusting retransmission opportunities within a connected isochronous stream (CIS). Generally, the described techniques provide for dynamic or "on-the-fly" adjustments to one or more CIS settings in accordance with a link quality between a first wireless device and a second wireless device. In some examples, the first wireless device and the second wireless device may support a configuration according to which the wireless devices tie a number of transmission opportunities that are usable for retransmissions, within a given isochronous (ISO) interval, to the link quality between the first wireless device and the second wireless device (which may be associated with a modulation and coding scheme (MCS) of the link). In such examples, the first wireless device and the second wireless device may increase the number of transmission opportunities that are usable for retransmissions as a link quality deteriorates (e.g., as an MCS decreases) and may decrease the number of transmission opportunities that are usable for retransmissions as a link quality improves (e.g., as the MCS increases).

A method for wireless communication at a first wireless device is described. The method may include transmitting or receiving a control message that indicates a mapping between a respective number of transmission opportunities that are allocated for retransmissions via a CIS and a respective MCS of the CIS, detecting a change to a MCS of the CIS during a first ISO interval of the CIS, adjusting, for a second ISO interval of the CIS, a number of transmission opportunities that are allocated for the retransmissions in accordance with detecting the change to the MCS and the mapping, where the first ISO interval and the second ISO interval span a same time duration, and transmitting or receiving one or more audio data packets with a second wireless device during the second ISO interval in accordance with the adjusted number of transmission opportunities that are allocated for the retransmissions.

An apparatus for wireless communication at a first wireless device is described. The apparatus may include a processor, memory coupled with the processor, and instructions stored in the memory. The instructions may be executable by the processor to cause the apparatus to transmit or receive a control message that indicates a mapping between a respective number of transmission opportunities that are allocated for retransmissions via a CIS and a respective MCS of the CIS, detect a change to a MCS of the CIS during a first ISO interval of the CIS, adjusting, for a second ISO interval of the CIS, a number of transmission opportunities that be allocated for the retransmissions in accordance with detecting the change to the MCS and the mapping, where the first ISO interval and the second ISO interval span a same time duration, and transmit or receive one or more audio data packets with a second wireless device during the second ISO interval in accordance with the adjusted number of transmission opportunities that are allocated for the retransmissions.

Another apparatus for wireless communication at a first wireless device is described. The apparatus may include means for transmitting or receiving a control message that indicates a mapping between a respective number of transmission opportunities that are allocated for retransmissions via a CIS and a respective MCS of the CIS, means for detecting a change to a MCS of the CIS during a first ISO interval of the CIS, means for adjusting, for a second ISO interval of the CIS, a number of transmission opportunities that are allocated for the retransmissions in accordance with detecting the change to the MCS and the mapping, where the first ISO interval and the second ISO interval span a same time duration, and means for transmitting or receiving one or more audio data packets with a second wireless device during the second ISO interval in accordance with the adjusted number of transmission opportunities that are allocated for the retransmissions.

A non-transitory computer-readable medium storing code for wireless communication at a first wireless device is described. The code may include instructions executable by a processor to transmit or receive a control message that indicates a mapping between a respective number of transmission opportunities that are allocated for retransmissions via a CIS and a respective MCS of the CIS, detect a change to a MCS of the CIS during a first ISO interval of the CIS, adjusting, for a second ISO interval of the CIS, a number of transmission opportunities that be allocated for the retransmissions in accordance with detecting the change to the MCS and the mapping, where the first ISO interval and the second ISO interval span a same time duration, and transmit or receive one or more audio data packets with a second wireless device during the second ISO interval in accordance with the adjusted number of transmission opportunities that are allocated for the retransmissions.

In some examples of the method, apparatuses, and non-transitory computer-readable medium described herein, adjusting the number of transmission opportunities that may be allocated for the retransmissions may include operations, features, means, or instructions for increasing the number of transmission opportunities that may be allocated for the retransmissions as the MCS decreases from a relatively higher MCS to a relatively lower MCS and decreasing the number of transmission opportunities as the MCS increases from the relatively lower MCS to the relatively higher MCS.

In some examples of the method, apparatuses, and non-transitory computer-readable medium described herein, adjusting the number of transmission opportunities that may be allocated for the retransmissions may include operations, features, means, or instructions for decreasing a burst number (BN) associated with the CIS as the MCS decreases from a relatively higher MCS to a relatively lower MCS, where decreasing the BN may be associated with an increase to the number of transmission opportunities that may be allocated for the retransmissions and increasing the BN associated with the CIS as the MCS increases from the relatively lower MCS to the relatively higher MCS, where increasing the BN may be associated with a decrease to the number of transmission opportunities that may be allocated for the retransmissions.

In some examples of the method, apparatuses, and non-transitory computer-readable medium described herein, adjusting the number of transmission opportunities that may be allocated for the retransmissions may include operations, features, means, or instructions for increasing a flush timeout (FT) associated with the CIS as the MCS decreases from a relatively higher MCS to a relatively lower MCS, where increasing the FT may be associated with an increase to the number of transmission opportunities that may be allocated for the retransmissions and decreasing the FT associated with the CIS as the MCS increases from the relatively lower MCS to the relatively higher MCS, where decreasing the FT may be associated with a decrease to the number of transmission opportunities that may be allocated for the retransmissions.

In some examples of the method, apparatuses, and non-transitory computer-readable medium described herein, a BN associated with the CIS, an FT associated with the CIS, and a packet size may be tuned for each MCS of a set of multiple MCSs and the BN, the FT, and the packet size may be dynamically changed in response to the change to the MCS.

Some examples of the method, apparatuses, and non-transitory computer-readable medium described herein may further include operations, features, means, or instructions for incrementing a protocol data unit (PDU) sequence number by a fixed value after the first ISO interval, where the first ISO interval may be associated with a first BN and incrementing the PDU sequence number by the fixed value after the second ISO interval, where the second ISO interval may be associated with a second BN that may be different from the first BN.

In some examples of the method, apparatuses, and non-transitory computer-readable medium described herein, the first wireless device increments the PDU sequence number by the fixed value after each ISO interval regardless of an actual BN associated with that ISO interval in accordance with adjusting the number of transmission opportunities that may be allocated for the retransmissions across ISO intervals.

In some examples of the method, apparatuses, and non-transitory computer-readable medium described herein, the mapping indicates, for each MCS of a set of multiple MCSs, the respective number of transmission opportunities that may be allocated for the retransmissions, timing information associated with an adjustment to the respective number of transmission opportunities that may be allocated for the retransmissions, and a size of a PDU.

In some examples of the method, apparatuses, and non-transitory computer-readable medium described herein, the control message further indicates, for each MCS, a quantity of sub-events or a quantity of sub-intervals during an ISO interval.

Some examples of the method, apparatuses, and non-transitory computer-readable medium described herein may further include operations, features, means, or instructions for indicating the size of the PDU for a length hardening function at the first wireless device and the second wireless device and reading, at each transmission opportunity of an ISO interval, an amount of data equal to the size of the PDU in accordance with indicating the size of the PDU to the length hardening function such that each PDU received by the first wireless device may have a same size, where the size of the PDU indicated to the length hardening function overrides a second size indicated by a header of the PDU.

Some examples of the method, apparatuses, and non-transitory computer-readable medium described herein may further include operations, features, means, or instructions for processing two or more failed attempts to decode a single PDU using a majority voting algorithm, where the majority voting algorithm may be associated with the size indicated to the length hardening function, and where the majority voting algorithm uses the size indicated to the length hardening function to correct the PDU if the majority voting algorithm detects a difference in a length field across the two or more failed attempts to decode the single PDU.

In some examples of the method, apparatuses, and non-transitory computer-readable medium described herein, the control message indicates the mapping between the respective number of transmission opportunities that may be allocated for the retransmissions and the respective MCS for each of two different communication directions and the mapping includes a first mapping for communications from a central device to a peripheral device and a second mapping for communications from the peripheral device to the central device.

In some examples of the method, apparatuses, and non-transitory computer-readable medium described herein, mapping entries associated with the second mapping may have a zero lengths when a backchannel link from the peripheral device to the central device may be disabled and may have non-zero lengths when the backchannel link from the peripheral device to the central device may be enabled and a transmission or reception of the control message dynamically enables or disables the backchannel link in accordance with whether the mapping entries associated with the second mapping may have the zero lengths or the non-zero lengths.

In some examples of the method, apparatuses, and non-transitory computer-readable medium described herein, transmitting or receiving the one or more audio data packets during the second ISO interval may include operations, features, means, or instructions for transmitting, to the second wireless device, the one or more audio data packets and a potential set of one or more retransmissions of the one or more audio data packets in accordance with the number of transmission opportunities that may be allocated for the retransmissions, where the first wireless device may be configured as a transmitting device and the second wireless device may be configured as a receiving device.

In some examples of the method, apparatuses, and non-transitory computer-readable medium described herein, transmitting or receiving the one or more audio data packets during the second ISO interval may include operations, features, means, or instructions for receiving, from the second wireless device, the one or more audio data packets and a potential set of one or more retransmissions of the one or more audio data packets in accordance with the number of transmission opportunities that may be allocated for the retransmissions, where the first wireless device may be configured as a receiving device and the second wireless device may be configured as a transmitting device.

BRIEF DESCRIPTION OF THE DRAWINGS

FIG. 3 shows an example of a communication timeline that supports techniques for dynamically adjusting retransmission opportunities within a CIS in accordance with one or more aspects of the present disclosure.

FIGS. 5 and 6 show examples of process flows that support techniques for dynamically adjusting retransmission opportunities within a CIS in accordance with one or more aspects of the present disclosure.

FIG. 11 shows a flowchart illustrating a method that supports techniques for dynamically adjusting retransmission opportunities within a CIS in accordance with one or more aspects of the present disclosure.

DETAILED DESCRIPTION

Figure 1:
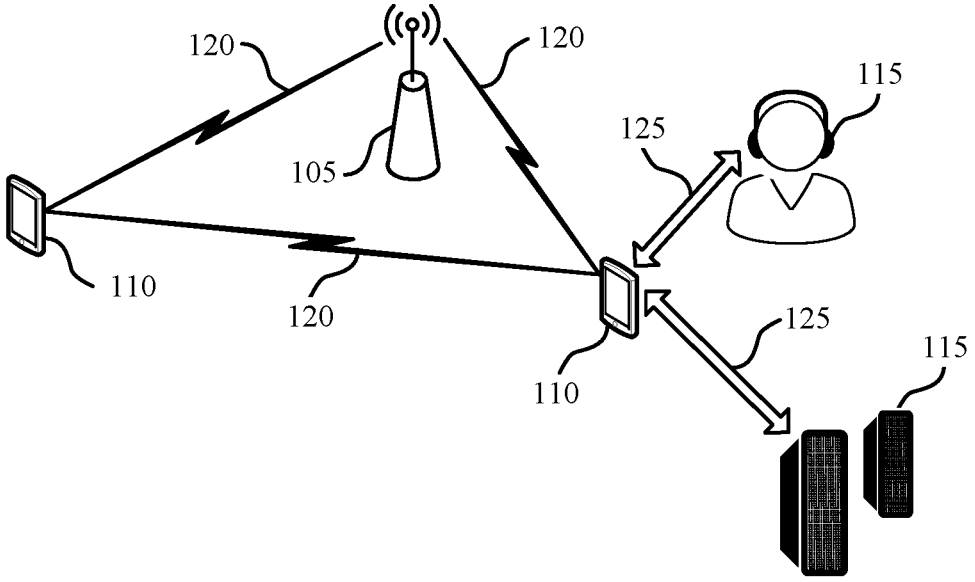
FIG. 1 shows an example of a wireless communications system that supports techniques for dynamically adjusting retransmission opportunities within a connected isochronous stream (CIS) in accordance with aspects of the present disclosure.

Some current wireless Bluetooth connections, such as connected isochronous stream (CIS) connections between a central device (e.g., a cell phone) and one or more peripheral devices (e.g., wireless earbuds), may follow relatively rigid timing protocols that are set during an initial setup configuration. For example, when setting up a CIS, two devices may negotiate on how many transmission opportunities to allocate to new data and how many transmission opportunities to allocate to any potential retransmissions, among other settings, and the two devices may follow the negotiated settings for an entirety of the established CIS. As such, to change the timing protocols of a CIS, the two devices may re-configure the link, which may enable a re-negotiation between the two devices and between any other devices that are currently sharing a same link or spectrum. Such a re-configuration and re-negotiation may introduce latency, be prone to failures, and potentially have adverse impacts on the other devices sharing the same link or spectrum.

In some implementations, a first wireless device and a second wireless device may support one or more dynamic or "on-the-fly" adjustments to one or more CIS settings in accordance with a link quality between the first wireless device and the second wireless device. In some examples, the first wireless device and the second wireless device may support a configuration according to which the wireless devices tie or correlate a number of transmission opportunities that are usable for retransmissions, within a given isochronous (ISO) interval, to the link quality between the first wireless device and the second wireless device (which may be tied or associated with a modulation and coding scheme (MC S) of the link). In such examples, the first wireless device and the second wireless device may increase the number of transmission opportunities that are usable for retransmissions as a link quality deteriorates (e.g., as an MCS decreases) and may decrease the number of transmission opportunities that are usable for retransmissions as a link quality improves (e.g., as the MCS increases).

The first wireless device and the second wireless device may control the number of transmission opportunities that are usable for retransmissions by controlling, toggling, or configuring one or more parameters associated with the CIS. Such one or more parameters may include a burst number (BN) or a flush timeout (FT), or both. For example, the first wireless device and the second wireless device may dynamically update a BN or an FT, or both, across ISO intervals within a CIS to dynamically adjust the number of transmission opportunities that are usable for retransmissions across the ISO intervals. Further, the first wireless device and the second wireless device may update the BN or the FT, or both, across ISO intervals without impacting other timing-related aspects of the CIS, such as without changing a duration of ISO intervals within the CIS.

Particular aspects of the subject matter described herein may be implemented to realize one or more of the following potential advantages. For example, in accordance with enabling a dynamic or "on-the-fly" updating of a BN or FT, or both, of a CIS across different ISO intervals without changing timing-related information associated with the CIS, wireless devices may more flexibly adapt a ratio between new data transmissions and retransmissions in accordance with current or recent link conditions without re-configuring the whole CIS or disrupting communication between other devices sharing the same link or spectrum. As such, the wireless devices may use more transmission opportunities for new data transmissions in low interference scenarios (e.g., when the link quality is relatively good) and may use more transmission opportunities for retransmissions in high interference scenarios (e.g., when the link quality is relatively poor). In other words, the wireless devices may achieve a balance, or control a tradeoff, between data rates and robustness (e.g., reliability) depending on link conditions. Accordingly, the wireless devices may experience higher data rates, greater spectral efficiency, and lower latency, among other benefits.

Aspects of the disclosure are initially described in the context of a multimedia system. Aspects of the disclosure are additionally illustrated by and described with reference to signaling diagrams, a communication timeline, and process flows. Aspects of the disclosure are further illustrated by and described with reference to apparatus diagrams, system diagrams, and flowcharts that relate to techniques for dynamically adjusting retransmission opportunities within a CIS.

FIG. 1 shows an example of a wireless communications system 100 that supports techniques for dynamically adjusting retransmission opportunities within a CIS in accordance with aspects of the present disclosure. In some examples, the wireless communications system 100 may include or refer to a wireless personal area network (PAN), a wireless local area network (WLAN, a Wi-Fi network) configured in accordance with various aspects of the present disclosure. The wireless communications system 100 may include an access point (AP) 105, devices 110 (e.g., which may be referred to as source devices, central devices, etc.), and paired devices 115 (e.g., which may be referred to as sink devices, peripheral devices, etc.) implementing WLAN communications (e.g., Wi-Fi communications) and/or Bluetooth communications. For example, devices 110 may include cell phones, user equipment (UEs), wireless stations (STAs), mobile stations, personal digital assistant (PDAs), other handheld devices, netbooks, notebook computers, tablet computers, laptops, or some other suitable terminology. Paired devices 115 may include Bluetooth-enabled devices capable of pairing with other Bluetooth-enabled devices (e.g., such as devices 110), which may include wireless audio devices (e.g., headsets, earbuds, speakers, ear pieces, headphones), display devices (e.g., TVs, computer monitors), microphones, meters, valves, etc.

Bluetooth communications may refer to a short-range communication protocol and may be used to connect and exchange information between devices 110 and paired devices 115 (e.g., between mobile phones, computers, digital cameras, wireless headsets, speakers, keyboards, mice or other input peripherals, and similar devices). Bluetooth systems (e.g., aspects of wireless communications system 100) may be organized using a central-peripheral relationship employing a time-division duplex protocol having, for example, defined time slots of 625 microseconds, in which transmission alternates between the central device (e.g., a device 110) and one or more peripheral devices (e.g., paired devices 115). In some examples, a device 110 may generally refer to a central device, and a paired device 115 may refer to a peripheral device in the wireless communications system 100. As such, in some examples, a device may be referred to as either a device 110 or a paired device 115 based on the Bluetooth role configuration of the device. That is, designation of a device as either a device 110 or a paired device 115 may not necessarily indicate a distinction in device capability, but rather may refer to or indicate roles held by the device in the wireless communications system 100. Generally, device 110 may refer to a wireless communication device capable of wirelessly exchanging data signals with another device (e.g., a paired device 115), and paired device 115 may refer to a device operating in a peripheral role, or to a short-range wireless communication device capable of exchanging data signals with the device 110 (e.g., using Bluetooth communication protocols).

A Bluetooth-enabled device may be compatible with certain Bluetooth profiles to use desired services. A Bluetooth profile may refer to a specification regarding an aspect of Bluetooth-based wireless communications between devices. That is, a profile specification may refer to a set of instructions for using the Bluetooth protocol stack in a certain way, and may include information such as suggested user interface formats, particular options and parameters at each layer of the Bluetooth protocol stack, etc. For example, a Bluetooth specification may include various profiles that define the behavior associated with each communication endpoint to implement a specific use case. Profiles may thus generally be defined according to a protocol stack that promotes and allows interoperability between endpoint devices from different manufacturers through enabling applications to discover and use services that other nearby Bluetooth-enabled devices may be offering. The Bluetooth specification defines device role pairs (e.g., roles for a device 110 and a paired device 115) that together form a single use case called a profile (e.g., for communications between the device 110 and the paired device 115). One example profile defined in the Bluetooth specification is the Handsfree Profile (HFP) for voice telephony, in which one device (e.g., a device 110) implements an Audio Gateway (AG) role and the other device (e.g., a paired device 115) implements a Handsfree (HF) device role. Another example is the Advanced Audio Distribution Profile (A2DP) for high-quality audio streaming, in which one device (e.g., device 110) implements an audio source device (SRC) role and another device (e.g., paired device 115) implements an audio sink device (SNK) role.

For a commercial Bluetooth-enabled device that implements one role in a profile to function properly, another device that implements the corresponding role may be present within the radio range of the first device. For example, in order for an HF device such as a Bluetooth headset to function according to the Handsfree Profile, a device implementing the AG role (e.g., a cell phone) may have to be present within radio range. Likewise, in order to stream high-quality mono or stereo audio according to the A2DP, a device implementing the SNK role (e.g., Bluetooth headphones or Bluetooth speakers) may have to be within radio range of a device implementing the SRC role (e.g., a stereo music player).

The Bluetooth specification defines a layered data transport architecture and various protocols and procedures to handle data communicated between two devices that implement a particular profile use case. For example, various logical links are available to support different application data transport requirements, with each logical link associated with a logical transport having certain characteristics (e.g., flow control, acknowledgement mechanisms, repeat mechanisms, sequence numbering, scheduling behavior, etc.). The Bluetooth protocol stack may be split in two parts: a controller stack including the timing critical radio interface, and a host stack handling high level data. The controller stack may be generally implemented in a low cost silicon device including a Bluetooth radio and a microprocessor. The controller stack may be responsible for setting up connection links 125 such as asynchronous connection-oriented links, (or asynchronous connection-oriented connections), synchronous connection-orientated (SCO) links (or SCO connections), extended synchronous connection-oriented (eSCO) links (or eSCO connections), other logical transport channel links, etc.

In some examples, the controller stack may implement link management protocol (LMP) functions, low energy link layer (LE LL) functions, etc. The host stack may be generally implemented as part of an operating system, or as an installable package on top of an operating system. The host stack may be responsible for logical link control and adaptation protocol (L2CAP) functions, Bluetooth network encapsulation protocol (BNEP) functions, service discovery protocol (SDP) functions, etc. In some examples, the controller stack and the host stack may communicate via a host controller interface (HCI). In other cases, (e.g., for integrated devices such as Bluetooth headsets), the host stack and controller stack may be run on the same microprocessor to reduce mass production costs. For such host-less systems, the HCI may be optional, and may be implemented as an internal software interface.

A connection link 125 may be established between two Bluetooth-enabled devices (e.g., between a device 110 and a paired device 115) and may provide for communications or services (e.g., according to some Bluetooth profile). For example, a Bluetooth connection may be an eSCO connection for voice call (e.g., which may allow for retransmission), an ACL connection for music streaming (e.g., A2DP), etc. For example, eSCO packets may be transmitted in predetermined time slots (e.g., 6 Bluetooth slots each for eSCO). The regular interval between the eSCO packets may be specified when the Bluetooth link is established. The eSCO packets to/from a specific device (e.g., paired device 115) are acknowledged, and may be retransmitted if not acknowledged during a retransmission window. In addition, audio may be streamed between a device 110 and a paired device 115 using an ACL connection (A2DP profile). In some cases, the ACL connection may occupy 1, 3, or 5 Bluetooth slots for data or voice. Other Bluetooth profiles supported by Bluetooth-enabled devices may include Bluetooth Low Energy (BLE) (e.g., providing considerably reduced power consumption and cost while maintaining a similar communication range), human interface device profile (HID) (e.g., providing low latency links with low power requirements), etc.

A device may, in some examples, be capable of both Bluetooth and WLAN communications. For example, WLAN and Bluetooth components may be co-located within a device, such that the device may be capable of communicating according to both Bluetooth and WLAN communication protocols, as each technology may offer different benefits or may improve user experience in different conditions. In some examples, Bluetooth and WLAN communications may share a same medium, such as the same unlicensed frequency medium. In such examples, a device 110 may support WLAN communications via AP 105 (e.g., over communication links 120). The AP 105 and the associated devices 110 may represent a basic service set (BSS) or an extended service set (ESS). The various devices 110 in the network may be able to communicate with one another through the AP 105. In some cases the AP 105 may be associated with a coverage area, which may represent a basic service area (BSA).

Devices 110 and APs 105 may communicate according to the WLAN radio and baseband protocol for physical and MAC layers from IEEE 802.11 and versions including, but not limited to, 802.11b, 802.11g, 802.11a, 802.11n, 802.11ac, 802.11ad, 802.11ah, 802.11ax, etc. In other implementations, peer-to-peer connections or ad hoc networks may be implemented within system 100, and devices may communicate with each other via communication links 120 (e.g., Wi-Fi Direct connections, Wi-Fi Tunneled Direct Link Setup (TDLS) links, peer-to-peer communication links, other peer or group connections). AP 105 may be coupled to a network, such as the Internet, and may enable a device 110 to communicate via the network (or communicate with other devices 110 coupled to the AP 105). A device 110 may communicate with a network device bi-directionally. For example, in a WLAN, a device 110 may communicate with an associated AP 105 via downlink (e.g., the communication link from the AP 105 to the device 110) and uplink (e.g., the communication link from the device 110 to the AP 105).

In some examples, content, media, audio, etc. exchanged between a device 110 and a paired device 115 may originate from a WLAN. For example, in some examples, device 110 may receive audio from an AP 105 (e.g., via WLAN communications), and the device 110 may then relay or pass the audio to the paired device 115 (e.g., via Bluetooth communications). In some examples, certain types of Bluetooth communications (e.g., such as high quality or high definition (HD) Bluetooth) may require enhanced quality of service. For example, in some examples, delay-sensitive Bluetooth traffic may have higher priority than WLAN traffic.

In some implementations, a first wireless device and a second wireless device (which may be examples of devices 110, paired devices 115, or any combination thereof) may support one or more dynamic or "on-the-fly" adjustments to one or more CIS settings in accordance with a link quality between the first wireless device and the second wireless device. In some examples, the first wireless device and the second wireless device may support a configuration or mapping according to which the wireless devices may tie a number of transmission opportunities that are usable for retransmissions, within a given ISO interval, to the link quality between the first wireless device and the second wireless device (which may be tied or associated with an MCS of the link). In such examples, the first wireless device and the second wireless device may increase the number of transmission opportunities that are usable for retransmissions as a link quality deteriorates (e.g., as an MCS decreases) and may decrease the number of transmission opportunities that are usable for retransmissions as a link quality improves (e.g., as the MCS increases).

The techniques described herein may provide improvements in data rates, robustness, and reliability in variable deployment scenarios. Furthermore, the techniques described herein may provide benefits and enhancements to the operation of the devices 110. For example, by enabling a balance or tradeoff between data rates and robustness (e.g., reliability) based on link conditions, the operational characteristics, such as power consumption, processor utilization, and memory usage, of the APs 105 may be reduced. The techniques described herein may also provide component-level or signaling-level, or both, efficiency to the devices 110 by reducing latency associated with processes related to dynamically managing how many transmission opportunities may be used for retransmissions within a given ISO interval of a CIS. In other words, the first wireless device and the second wireless device may be example apparatuses (or include example apparatuses) and perform techniques to dynamically configure a Bluetooth CIS, such as a Bluetooth Low Energy (BLE) CIS, to improve robustness.

Figure 2:
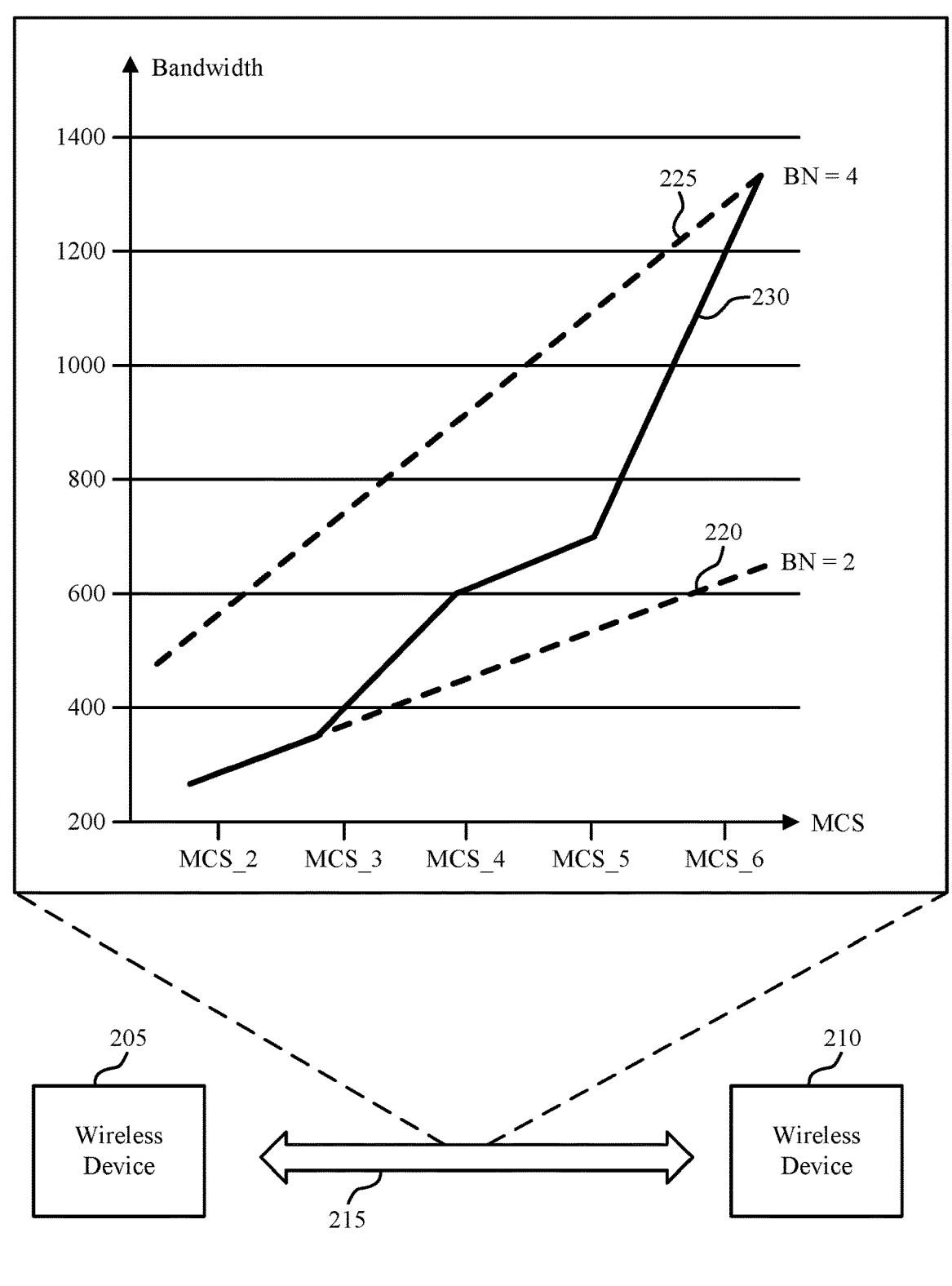
FIG. 2 shows an example of a signaling diagram that supports techniques for dynamically adjusting retransmission opportunities within a CIS in accordance with one or more aspects of the present disclosure.

FIG. 2 shows an example of a signaling diagram 200 that supports techniques for dynamically adjusting retransmission opportunities within a CIS in accordance with one or more aspects of the present disclosure. The signaling diagram 200 may implement or be implemented to realize aspects of the wireless communications system 100. For example, the signaling diagram 200 illustrates communication between a wireless device 205 and a wireless device 210 via a communication link 215, where the wireless device 205 and the wireless device 210 may be examples of devices 110 or paired devices 115, or a device 110 and a paired device 115, as illustrated by and described with reference to FIG. 1.

In some aspects, one of the wireless device 205 and the wireless device 210 may be a central device, an initiator, a source device, or a first host and initiating layer and the other of the wireless device 205 and the wireless device 210 may be a peripheral device, an acceptor, a sink device, or a second host and responding layer. In some implementations, the wireless device 205 or the wireless device 210, or both, may support a configuration or mapping according to which a number of transmission opportunities that may be used for retransmissions dynamically changes in accordance with (e.g., as a result of) changes in a link quality of the communication link 215.

In some deployment scenarios, the wireless device 205 and the wireless device 210 may support low energy (LE) audio (e.g., as part of a Bluetooth standard), which may offer profile- or protocol-associated advantages, such as advantages associated with an advanced audio distribution profile (A2DP) and an enhanced synchronous connection orientated (eSCO) protocol, with real time audio, lower power, and high-quality audio. In some aspects, however, LE audio may be associated with a rigid timing protocol, which may be poorly suited to cope with a changing wireless environment or a changing behavior of a user. In other words, once a link (e.g., a Bluetooth wireless link) is setup, configured, or established, the timing protocol associated with the link may be static (and inflexible) for a duration of the link.

When setting up a BLE wireless link, one or both of the wireless device 205 and the wireless device 210 may consider one or more potential trade-offs associated with the link. One consideration may be associated with a sharing of a 2.4 GHz link with Wi-Fi bandwidth (e.g., one or more Wi-Fi devices may use the 2.4 GHz link in addition to the wireless device 205 and the wireless device 210). For example, Wi-Fi devices may have the option to use the 2.4 GHz link, a 5 GHz link, a 6 GHz link, or a 7 GHz link, or any combination thereof, which may constrain Bluetooth devices and Wi-Fi devices to timeshare resources on the 2.4 GHz link.

Further, Bluetooth devices and Wi-Fi devices may timeshare resources on the 2.4 GHz link even if the Wi-Fi devices are operating using the 5 GHz link, as a BLE link may be set up to enable a sharing of the bandwidth with the Wi-Fi devices regardless of which link the Wi-Fi devices actually use. Such a setup constraint to enable sharing may be employed because, as a Wi-Fi device roams (e.g., as a user roams with their phone), the Wi-Fi device (e.g., the phone) may change between different APs 105 with no control over whether the 2.4 GHz link or the 5 GHz link is to be used. A device may reserve approximately 2 megabits per second (Mbps) of bandwidth for Wi-Fi for the device to maintain a "good" (e.g., reliable, robust, etc.) connection to the internet.

Another consideration may be a trade-off for quality against robustness. For example, as a user uses a device (e.g., their phone), the user may change the way they interact with it (e.g., holding the device at arms-length, setting it down and walking away, putting it in a back pocket of the user, etc.), and an error rate of a link between the device and, for example, an earbud or headset may change. For instance, holding a device at arms-length, setting it down and walking away, or putting it in a back pocket of the user may increase the error rate of the link, resulting in more retransmissions. The over-the-air (OTA) time allocated to the Bluetooth link, however, may be fixed (e.g., in accordance with an initial setup), and may accommodate both bandwidth for new data as well as for retransmissions. Accordingly, because the OTA time is fixed, an increase in retransmissions may reduce an amount of bandwidth that may be used by an audio stream (e.g., an audio stream of new audio data packets).

Further, another consideration may be that a user may use a voice channel while using an application (e.g., when playing a video game). Whether such a voice channel is to be used, however, may be unknown when the link is initially set up. As such, the wireless device 205 or the wireless device 210, or both, may reserve bandwidth for such a voice channel during initial setup in case it is used in the future. As such, a sufficient bandwidth for the voice channel may be available if a user desires to use the voice channel at some point after initial link setup, but that bandwidth may otherwise go unused when the user does not use the voice channel.

In some Bluetooth profiles, such as A2DP, a packet size and an interval between packets may be adjusted dynamically. This flexibility, however, may not be available in some deployments of other profiles, such as LE audio, which may force a re-configuration of a link to make any changes in packet size or interval between packets. Such a re-configuration of a link may cause a break in an audio stream, which may adversely impact a user experience. Further, the rigid time constraints associated with LE audio may not allow an audio stream to be adjusted responsive to changes in a wireless environment.

Such changes in wireless environment may result from a removal of a wire between a device 110 (e.g., a phone) and earbuds. For example, while a user may no longer be tethered to a phone of the user with a wire (and instead may have the freedom to walk away from the phone), the user may still expect a same level of quality and latency. In other words, a user may expect a seamless audio experience from high quality audio that is synchronized (e.g., lip synched) to a video and to be able to place a phone in their back pocket or bag without glitches.

In some (e.g., manufacturer- or product-specific) extensions to a BLE standard, some devices may support an ability to adapt a link rate to changes in the environment. Such a link rate adaptation may handle a range of use cases, such as when a user is close to a phone and when a user is at a distance from a phone. In some examples, such a link rate may be referred to or understood as, or reflected by, an MCS. Further, an MCS may be associated with a data rate protocol, which may be manufacturer- or product-specific, and may range, for example, from an MCS2 to an MCS6. In such examples, however, a range of MCS2 to MCS6 may be insufficient to stream at a bandwidth offered or supported by some (e.g., manufacturer- or product-specific) data rate protocols because of the locked link configuration associated with BLE audio and the built-in robustness set assuming (e.g., to be able to handle) a worst-case scenario (e.g., which may refer to a scenario in which a user attempts to use an upper limit data rate or amount of bandwidth for an audio data stream).

In some implementations, one or both of the wireless device 205 and the wireless device 210 may employ a technique to allow a link (e.g., the communication link 215) to be dynamically configured without re-establishing the link. Further, in accordance with the described techniques, the wireless device 205 and the wireless device 210 may dynamically configure some aspects of the communication link 215 (e.g., a BLE wireless link) without affecting the timing of an established CIS and without causing a break in the audio. As such, the wireless device 205 and the wireless device 210 may trade robustness for bandwidth (e.g., may balance a number of retransmissions and bandwidth).

For example, while MCS rates may allow matching of the audio quality to the wireless environment, the MCS rates alone may not address a fundamental problem associated with BLE that a ratio of retries cannot, in some deployments, be adjusted dynamically (e.g., without tearing down and re-establishing the link). Instead, in some cases, all MCS rates may be locked to a same configuration (e.g., a same fixed BLE link configuration). In some aspects, a use case associated with the techniques described herein may be for audio quality to be traded for robustness of a range of bitrates from 100 kilobits per second (KBps) to 750 KBps. Further, the MCS2 to MCS6 rates may be limited to a ratio of 1:3. As such, in some implementations, the wireless device 205 or the wireless device 210, or both, may tie a change in a number of retransmission opportunities to the modulation scheme (e.g., the MCS). As such, if a rate adaptation algorithm drops from MCS6 to MCS2 as the communication link 215 degrades, the link configuration may be adjusted such that a number of transmission opportunities that may be used for retransmissions is increased (in synchronization with a reduction in a bit rate of a codec).

Further, the wireless device 205 or the wireless device 210, or both, may configure a change in the number of retransmissions without changing the timing of the CIS (which may enable compatibility with a Bluetooth standard and also avoid disrupting other devices, as changing the timing of an ISO interval or CIS not only is associated with a re-negotiation at the sender and receiver, but also other devices that are using the BLE link, where all of such re-negotiation may have a relatively high robustness criterion in degraded wireless environments). By linking a BN (which is inversely proportional to the number of retries available in a given ISO interval) or an FT, or both, to the modulation, the wireless device 205 and the wireless device 210 may refrain from tuning one set of values or settings for a CIS for performance in a worst-case environment, and may instead support multiple different sets of values for the CIS that are each tuned for various different environments.

For example, the modulation may reflect the wireless environment (e.g., how "good" or "bad" the wireless environment is, which may vary over time) and the wireless device 205 or the wireless device 210 may rely on the MCS, and changes in MCS, to inform how a BN or an FT, or both, changes across ISO intervals within a CIS. For example, MCS6 may be used when the communication link 215 has relatively low errors and may drop toward MCS2 if the communication link 215 degrades. Accordingly, the number of retries available in a given ISO interval (which may be controlled via a BN or an FT, or both) may be tuned for a set of points in that range that reflects the link performance, as illustrated in FIG. 2.

For example, for each MCS (from MCS2 to MCS6), the number of transmission opportunities that are available for retransmissions may be tuned to provide or enable a tradeoff between encoded audio bandwidth and bandwidth for additional retries. An example bandwidth that can be achieved for a given BN for each MCS is shown by FIG. 2. As illustrated in FIG. 2, a line 220 and a line 225 mark the bandwidth for BN=2 and BN=4, respectively, as MCS changes and a line 230 shows how changing the BN may give a greater maximum bandwidth as compared to turning to a worst-case scenario (e.g., decreasing to MCS2, or tearing down and re-establishing the link with a lower BN, such as going from a BN=4 to a BN=2). For example, instead of dropping from MCS6 to MCS2, the wireless device 205 or the wireless device 210 may drop from BN=4 to, for example, BN=3 and achieve a greater bandwidth (e.g., for at least MCS5 and MCS4).

In other words, the signaling diagram 200 illustrates an audio stream bitrate for each modulation. Further, to change the number of transmission opportunities that are available for retransmissions, the wireless device 205 or the wireless device 210 may change a BN, an FT, or a packet size. As such, the wireless device 205 or the wireless device 210 may tune the BN, the FT, the packet size, or any combination thereof to give or set a tradeoff between the encoded audio bandwidth and the bandwidth for additional retries.

Changing the BN may provide more transmission opportunities and may result in an ability of the communication link 215 to handle higher rates of packet errors. For example, the greater the number of opportunities that may be used for retransmissions, the greater the packet error rate (PER) that the communication link 215 may withstand. As an example, if a target is a maximum of one lost packet per hour, the maximum PER may be calculated for a given retry budget, as shown in Table 1 where the maximum PER for each MCS is calculated based on a BN. Further, Table 1 shows an example of the BN value and retry budget (e.g., used in a working system) and the resulting maximum PER. Further, the reference sensitivity may be calculated in accordance with 30.8% PER/≈1E-3 BER.

TABLE 1

| BN Value and Retry Budget, and Resulting Maximum PER | | | | | | |
|---|---|---|---|---|---|---|
| | MCS2 | MCS3 | MCS4 | MCS5 | MCS6 | Units |
| Reference Sensitivity | −105 | −102 | −98 | −95.5 | −91 | dBm |
| BN | 2 | 2 | 3 | 3 | 4 | |
| Space Available for retransmissions | 6/8 | 6/8 | 5/8 | 5/8 | 4/8 | % of OTA Bandwidth |
| Maximum PER allowed | 1/24 | 1/24 | 1/121 | 1/121 | 1/600 | |

Further, for robustness, the wireless device 205 and the wireless device 210 may support techniques such that the communication link 215 is able to handle cases in which protocol data units (PDUs) of several ISO intervals are missed or lost. For example, if a receiving device (e.g., a sink) goes out of range of a transmitting device (e.g., a source), even briefly, and misses one or more isochronous events or intervals entirely, there may be a relatively high likelihood that the number of PDUs flushed by the receiving device does not match the number of PDUs sent (and flushed) by the transmitting device. If this mismatch occurs, a payload counter used for encryption between the wireless device 205 and the wireless device 210 may be off, and potentially unrecoverable. For example, if there is a difference in BN of just one between the transmitting device and what is assumed or expected by the receiving device, after FT+1 ISO intervals, the payload counters between the transmitting device and the receiving device may be off by 2. If the payload counters at the transmitting device and the receiving device are different, a recovery option (e.g., a single recovery option) for the transmitting device and the receiving device may be to terminate and re-establish the CIS.

As such, in some implementations, the wireless device 205 and the wireless device 210 may always force a number BN MAX rolls of the payload counter used for encryption at the end of the CIS event (e.g., at the end of each ISO interval). As such, the wireless device 205 and the wireless device 210 may have synchronized payload counters at the beginning of each service data unit (SDU). For example, both the wireless device 205 and the wireless device 210 may increment a PDU sequence number by a fixed value after each ISO interval, regardless of an actual BN used for that ISO interval. As such, even if two ISO intervals are associated with different BNs in accordance with the implementations described herein, the wireless device 205 and the wireless device 210 may increment the PDU sequence number by a same, fixed value after each of the two different ISO intervals. In other words, the wireless device 205 and the wireless device 210 may support a technique associated with encryption to improve robustness to one or multiple lost packets.

FIG. 3 shows an example of a communication timeline 300 that supports techniques for dynamically adjusting retransmission opportunities within a CIS in accordance with one or more aspects of the present disclosure. The communication timeline may implement or be implemented to realize or facilitate aspects of the wireless communications system 100 or the signaling diagram 200. For example, the communication timeline 300 illustrates communication between an initiator (e.g., a transmitting device or a source device) and an acceptor (e.g., a receiving device or a sink device), which may be examples of any one or more devices as illustrated by and described with reference to FIGS. 1 and 2. In some implementations, the initiator and the acceptor may establish a CIS 305 associated with a set of ISO intervals 310 (which may refer to any one or more of an ISO interval 310-*a*, an ISO interval 310-*b*, and an ISO interval 310-*c*) and may dynamically update or change how many transmission opportunities are available for retransmissions across ISO intervals 310 within the CIS 305.

In the example of the communication timeline 300, the ISO interval 310-*a* may include 4 transmission opportunities 315 for the initiator, including a transmission opportunity 315-*a*, a transmission opportunity 315-*b*, a transmission opportunity 315-*c*, and a transmission opportunity 315-*d*. The transmission opportunities 315 may be associated with sub-events, such that the ISO interval 310-*a* (and a CIS event associated with the ISO interval 310-*a*) may include 4 sub-events (e.g., number of sub-events (NSE)=4). In some aspects, the initiator and the acceptor may support a BN value of 2 and an FT value of 1 for the ISO interval 310-*a*. As such, the initiator may supply 2 payloads (e.g., PDUs) for transmission in the CIS event associated with the ISO interval 310-*a*. As shown by the communication timeline 300, the initiator may supply a PDU_0 and a PDU_1 for transmission in the CIS event associated with the ISO interval 310-*a*.

In some examples, the acceptor may successfully receive the PDU_0 in an initial transmission of the PDU_0 and may transmit an acknowledgment (ACK) 320 to the initiator responsive to the PDU_0. The transmission opportunity 315-*a* and the ACK 320 may be within a same sub-event. As such, the initiator may proceed to transmitting the PDU_1, which the initiator may initially transmit during the transmission opportunity 315-*b*. If the initiator fails to receive an ACK (or receives a negative ACK (NACK)) for the PDU_1, the initiator may perform one or more retransmissions of the PDU_1. For example, the initiator may retransmit the PDU_1 during each of the transmission opportunity 315-*c* and the transmission opportunity 315-*d* (e.g., in the absence of any ACK for the PDU_1). As a result of the CIS event associated with the ISO interval 310-*a* including 4 sub-events and the FT being equal to 1, the initiator and the acceptor may flush the PDU_1. In other words, the initiator may discard (and refrain from further (re)transmission of)

the PDU_1 after the ISO interval 310-*a*. Likewise, the acceptor may refrain from monitoring for the PDU_1 after the ISO interval 310-*a*.

In some implementations, one or both of the initiator and the acceptor may detect or measure that a quality of a link between the initiator and the acceptor changes and may update one or more parameters associated with the CIS 305 to correspondingly adjust the number of transmission opportunities that are available for retransmissions. For example, the initiator or the acceptor may detect or measure that a quality of the link deteriorates (e.g., may measure an increase in interference, a decrease in received signal quality or strength, or a decrease in an MCS used for communication using the link) during the ISO interval 310-*a* and, in some implementations, may dynamically update one or more parameters of the CIS 305 for the ISO interval 310-*b* to increase the number of transmission opportunities that may be used for retransmissions.

In the example of the communication timeline 300, for instance, the initiator and the acceptor may update the BN and the FT of the CIS 305 such that the BN is equal to 1 and the FT is equal to 2 for the ISO interval 310-*b*. As such, the initiator may perform an initial transmission of a PDU_2 (e.g., as a result of flushing the PDU_1) during a transmission opportunity 325-*a*. If the initiator fails to receive an ACK for the PDU_2 (or receives a NACK), the initiator may retransmit the PDU_2 during one or more other transmission opportunities 325 of the ISO interval 310-*b*. As illustrated by the communication timeline 300, the initiator may retransmit the PDU_2 during each of a transmission opportunity 325-*b*, a transmission opportunity 325-*c*, and a transmission opportunity 325-*d* in the absence of a reception of an ACK for the PDU_2. In some examples, the acceptor may successfully receive the PDU_2 during the transmission opportunity 325-*d* and may transmit an ACK 330 for the PDU_2. The transmission opportunity 325-*d* and the ACK 330 may be within a same sub-event.

In some implementations, the initiator or the acceptor may detect or measure that a quality of the link between the initiator and the acceptor changes and may update one or more parameters associated with the CIS 305 to correspondingly adjust the number of transmission opportunities that are available for retransmissions. For example, the initiator or the acceptor may detect or measure that a quality of the link improves (e.g., may measure a decrease in interference, an increase in received signal quality or strength, or an increase in an MCS used for communication using the link) during the ISO interval 310-*b* and, in some implementations, may dynamically update one or more parameters of the CIS 305 for the ISO interval 310-*c* to decrease the number of transmission opportunities that may be used for retransmissions.

In the example of the communication timeline 300, for instance, the initiator and the acceptor may update the BN and the FT of the CIS 305 such that the BN is equal to 2 and the FT is equal to 2 for the ISO interval 310-*c*. As such, the initiator may perform an initial transmission of a PDU_3 (e.g., as a result of receiving the ACK 330 for the PDU_2) during a transmission opportunity 335-*a*. If the acceptor successfully receives the PDU_3 during the transmission opportunity 335-*a*, the acceptor may transmit an ACK 340. The transmission opportunity 335-*a* and the ACK 340 may be within a same sub-event. In accordance with receiving the ACK 340 for the PDU_3, the initiator may transmit a PDU_4 during a transmission opportunity 335-*b*. If the initiator fails to receive an ACK for the PDU_4 (or receives a NACK), the initiator may perform one or more retransmissions of the PDU_4. For example, the initiator may retransmit the PDU_4 during each of a transmission opportunity 335-*c* and a transmission opportunity 335-*d*. In some examples, the acceptor may successfully receive the PDU_4 during the transmission opportunity 335-*d* and may transmit an ACK 345 for the PDU_4. The transmission opportunity 335-*d* and the ACK 345 may be within a same sub-event.

Further, although illustrated by and described in the context of dynamically changing how many transmission opportunities are available to retransmissions via adjustments or updates to one or both of a BN or an FT of the CIS 305 across ISO intervals 310, the initiator and the acceptor may additionally, or alternatively, adjust or update a packet size of the PDUs that are transmitted in each of the ISO intervals 310, an NSE in each CIS event or ISO interval 310, or a number of sub-intervals (where a sub-interval may correspond to a sub-event) in each CIS event or ISO interval 310.

Further, as described herein, the initiator and the acceptor may dynamically change how many transmission opportunities are available to retransmissions across ISO intervals 310 within a CIS 305 in accordance with a mapping between the number of transmission opportunities that may be used for retransmissions (or one or more parameters that influence the number of transmission opportunities that may be used for retransmissions) and an MCS used by the initiator and the acceptor. The mapping may be signaled between the initiator and the acceptor, configured at each of the initiator and the acceptor, or any combination thereof. In some aspects, the initiator and the acceptor may use a first mapping for communications from a central device to a peripheral device and a second mapping for communications from the peripheral device to the central device, as described in more detail with reference to FIG. 4.

Figure 4:
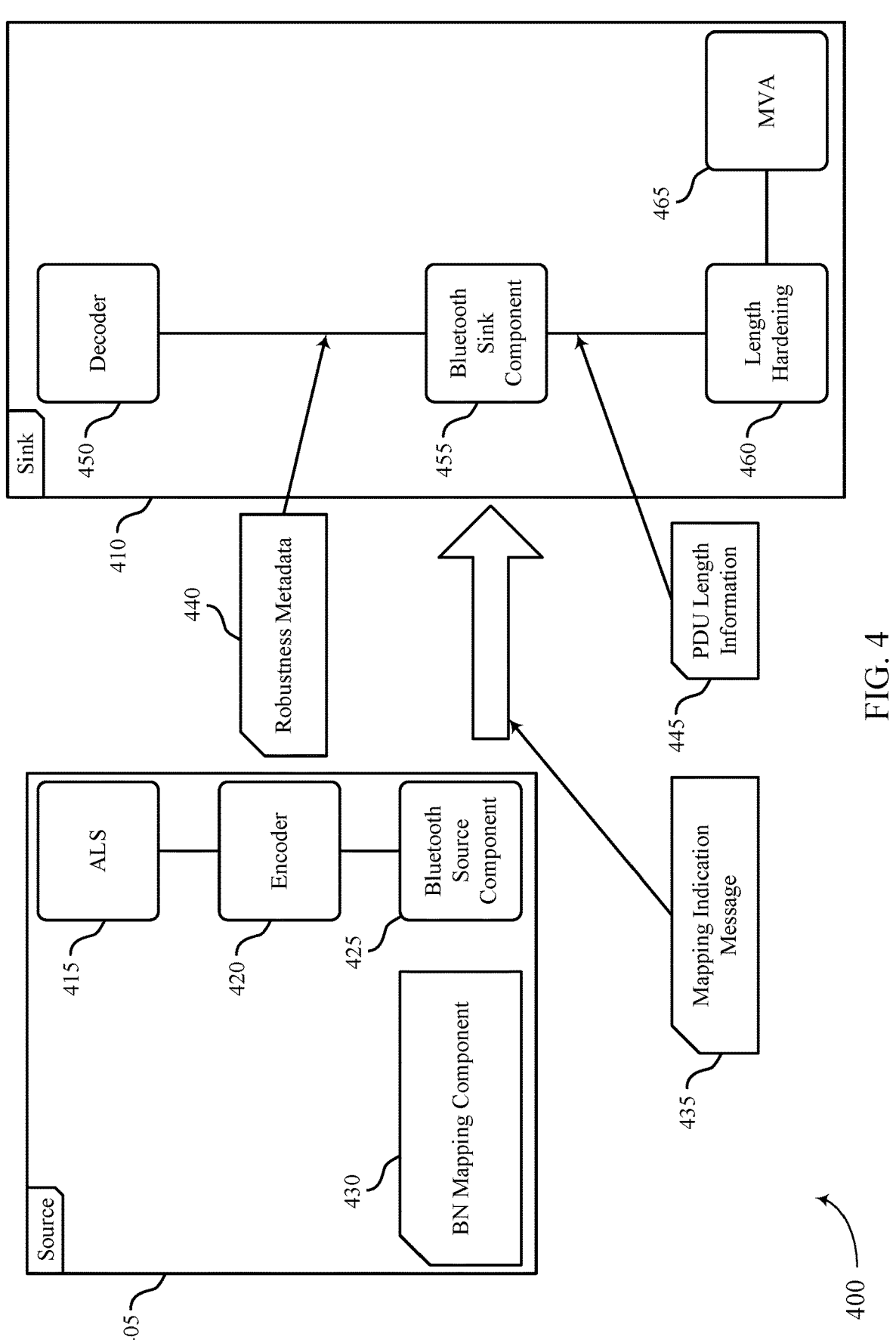
FIG. 4 shows an example of a signaling diagram that supports techniques for dynamically adjusting retransmission opportunities within a CIS in accordance with one or more aspects of the present disclosure.

FIG. 4 shows an example of a signaling diagram 400 that supports techniques for dynamically adjusting retransmission opportunities within a CIS in accordance with one or more aspects of the present disclosure. The signaling diagram 400 may implement or be implemented to realize or example of the wireless device 205 or the wireless device 210 or an initiator as illustrated by and described with reference to FIGS. 2 and 3. Further, the sink device 410 may be an example of the wireless device 205 or the wireless device 210 or an acceptor as illustrated by and described with reference to FIGS. 2 and 3.

In some implementations, the source device 405 and the sink device 410 may support signaling associated with a dynamic CIS configuration update to increase or decrease the number of transmission opportunities that may be used for retransmissions. For example, the source device 405 and the sink device 410 may negotiate, indicate, or agree on a set of CIS settings (e.g., including a change in BN or a number of retries) for each MCS (e.g., each MCS rate). The source device 405 and the sink device 410 may use a mapping indication message 435 for such negotiation, indication, or agreement. The mapping indication message 435 may include a table of values for BN that are to be used for each MCS, timing information including a time when a value is to be applied allowing the BN to be dynamically updated, or a maximum length of a PDU for each MCS (as a change in BN may also impact the maximum length of a PDU), or any combination thereof.

In other words, the mapping indication message 435 may indicate a mapping between how many transmission opportunities are available for retransmissions (e.g., via a BN value and a PDU packet length) for each MCS. Further, in some implementations, the mapping indication message 435 may indicate two separate mappings, including a first mapping for communications from a central device to a peripheral device and a second mapping for communications from the peripheral device to the central device. As such, the source device 405 and the sink device 410 may use the mapping indication message 435 to setup and update of a CIS. An example structure, format, and content of the mapping indication message 435 (e.g., of a control data field of the mapping indication message 435) is illustrated by Table 1, shown below.

TABLE 1

| Content of Mapping Indication Message Control Data Field of Mapping Indication Message | | |
|---|---|---|
| CIG_ID (1 octet) | CIS_ID (1 octet) | cisEventCount (2 octets) |
| Flags (1 octet) | Max_PDU_C_To_P_MCS6 (2 octets) | Max_PDU_P_To_C_MCS6 (2 octets) |
| BN_C_To_P_MCS6 (1 octet) | BN_P_To_C_MCS6 (1 octet) | Max_PDU_C_To_P_MCS5 (2 octets) |
| Max_PDU_P_To_C_MCS5 (2 octets) | BN_C_To_P_MCS5 (1 octet) | BN_P_To_C_MCS5 (1 octet) |
| Max_PDU_C_To_P_MCS4 (2 octets) | Max_PDU_P_To_C_MCS4 (2 octets) | BN_C_To_P_MCS4 (1 octet) |
| BN_P_To_C_MCS4 (1 octet) | Max_PDU_C_To_P_MCS3 (2 octets) | Max_PDU_P_To_C_MCS3 (2 octets) |
| BN_C_To_P_MCS3 (1 octet) | BN_P_To_C_MCS3 (1 octet) | Max_PDU_C_To_P_MCS2 (2 octets) |
| Max_PDU_P_To_C_MCS2 (2 octets) | BN_C_To_P_MCS2 (1 octet) | BN_P_To_C_MCS2 (1 octet) | facilitate aspects of the wireless communications system 100, the signaling diagram 200, or the communication timeline 300. For example, the signaling diagram 400 illustrates communication between a source device 405 and a sink device 410, which may be examples of corresponding devices as illustrated by and described with reference to FIGS. 1-3. For example, the source device 405 may be an As illustrated by Table 1, "Max_PDU_C_To_P_MCS6" may indicate a maximum PDU length for communications from a central device to a peripheral device for MCS6, "Max_PDU_P_To_C_MCS6" may indicate a maximum PDU length for communications from a peripheral device to a central device for MCS6, "BN_C_To_P_MCS6" may indicate a BN for communications from a central device to a peripheral device for MCS6, and "BN_P_To_C_MCS6" may indicate a BN for communications from a peripheral device to a central device for MCS6. The mapping indication message 435 may similarly indicate maximum PDU lengths and BN values, for central to peripheral communication and for peripheral to central communication, for each MCS value from MCS6 to MCS2. As such, the source device 405 and the sink device 410 may update BN values synchronously (in a same way) as MCS changes.

As an extension to the signaling of the mapping indication message 435, the source device 405 and the sink device 410 may support a dynamic use of a microphone backchannel. For example, while a user plays a game, other gamers may join or leave. The user might open a voice backchannel or receive a call while listening to audio from the game. Further, at the implementation-level, there may be multiple ways that a phone may access the microphones on a set of earbuds. For example, each earbud may have a microphone and switching microphones may be used to select the microphone with the best signal. At other times, a phone may use both microphones to allow more sophisticated down-mixing and signal extraction techniques to be used. Such a dynamic behavior may not be possible in some deployments, as, instead, when a CIS is created the bandwidth for a microphone backchannel may be allocated (even if it is not used from the start of the CIS, because the BLE protocol may not allow the bandwidth for the return channel to be adjusted dynamically).

BLE may define a SUB INTERVAL to have 2 PDUs (e.g., one packet in both directions), where each PDU is used to acknowledge the PDU in the opposite direction. As such, a PDU that has no payload may be an ACK. In some cases, Max_PDU_C_To_P and the Max_PDU_P_To_C fields of a CIS request message may give the maximum size of the PDUs in each direction, where a zero size may indicate that no data is carried in that corresponding direction.

As such, in some implementations, the source device 405 may use the mapping indication message 435 to dynamically enable or disable a communication link from a peripheral device to a central device (e.g., a microphone backchannel) by setting corresponding fields of the mapping indication message 435 to zero lengths or non-zero lengths, respectively. For example, if mapping entries associated with the second mapping (for communications from a peripheral device to a central device) have zero lengths, a backchannel link from a peripheral device to a central device may be disabled. Alternatively, if mapping entries associated with the second mapping have non-zero lengths, the backchannel link from the peripheral device to the central device may be enabled. As such, transmission or reception of the mapping indication message 435 may dynamically enable or disable the backchannel link.

In other words, the mapping indication message 435 may indicate a dynamic adjustment to the bandwidth allocated for the backchannel, which may include a zero length when the link is (e.g., temporarily) disabled. For link robustness, this may allow the bandwidth to be traded between the up and down links. For example, a voice link may be easier for a packet loss concealment (PLC) to hide lost packets, whereas a link with complex audio may be harder for the PLC to hide lost packets. Therefore, given the two links in an example, the bandwidth of the complex audio link may be protected over the voice backchannel.

The source device 405 may include one or more components to implement the techniques described herein. For example, the source device 405 may include an adaptive service layer (ALS) 415, an encoder 420, and a Bluetooth source component 425. The source device 405 may further include a BN mapping component 430, which the source device 405 may use to initialize and update the table of BN values indicated via the mapping indication message 435. The sink device 410 may include one or more components to implement the techniques described herein. For example, the sink device 410 may include a decoder 450, a Bluetooth sink component 455, a length hardening component 460, and a majority voting algorithm (MVA) component 465. The decoder 450 may provide robustness metadata 440 to the Bluetooth sink component 455. Further, the Bluetooth sink component 455 may provide PDU length information 445 (e.g., as obtained from the mapping indication message 435) to the length hardening component 460.

For example, as another extension to the signaling of the mapping indication message 435, the sink device 410 may supply the mapping indication message 435 to the length hardening component 460, which may increase an ability of the sink device 410 to correct potentially erroneously-received PDUs. For instance, while payload and modulation of a packet may be protected by forward error correction (FEC) and MVA, a length field may still remain a relative weakness of a PDU (e.g., corrupt headers, which may indicate a PDU length, may be a significant cause of lost packets). Further, at a bit error rate of $10^{-3}$, a 10-bit length field as used by some extensions may have 1 in 100 PDUs with a length error, which may correspond to approximately 3 PDUs per second (e.g., expecting 3 retries and a 10 millisecond audio frame).

The length may have a significant effect on an ability of an MVA (e.g., the MVA component 465) to repair a packet. For example, if a packet is erroneously shortened, there may not be enough data to apply majority voting (e.g., an MVA). Further, LE audio standards may specify 3 reception opportunities in some configurations, which may lead to no combining. In a low latency streaming or broadcast, this may amount to 3 PDU packets per second for which the majority voting cannot be applied. For the calculating of a cyclic redundancy check (CRC), length hardened bits may be used instead of actually received bits. As such, a technique of length hardening that uses the mapping indication message 435 may allow the dynamic change in bitrate while also mitigating the weaknesses of the length field. This technique may be used with any LE audio streams as relevant standards define a fixed-size low complexity communication codec (LC3) audio frame.

For example, the sink device 410 may receive the mapping indication message 435 and indicate a size of a PDU to the length hardening component 460 (e.g., a length hardening function) and, accordingly, the sink device 410 may read, at each transmission opportunity of an ISO interval, an amount of data equal to the size of the PDU indicated to the length hardening component 460. As such, each PDU received by the sink device 410 has a same size (e.g., as the size indicated to the length hardening component 460 may override a size indicated by length field of a header of a PDU).

In some aspects, the override of the length field may occur if enabled and when the header is processed (e.g., a modem may use the size indicated to the length hardening component 460 when a packet is received, as otherwise the modem may read the header and use the length field to configure how much data to read from the channel, which may also effect the parity). In other words, the modem of the sink device 410 may be forced to read a fixed amount of data from a physical channel in accordance with the size indicated to the length hardening component 460, and the fixed amount of data may be defined for each MCS. As such, the length hardening may be an extension of the signaling of the mapping indication message 435 to improve the robustness to bit errors in the length field.

Accordingly, if the sink device 410 fails to decode a single or same PDU multiple (e.g., two or more times), the sink device 410 may process the multiple failed attempts to decode the PDU using a majority voting algorithm, where the majority voting algorithm uses the size indicated to the length hardening component 460 to correct the PDU if the majority voting algorithm detects a difference in a length field of the multiple failed decoding attempts (e.g., if the error is at the length field of the PDU, as the majority voting algorithm may be an algorithm that attempts to fix errors in a PDU by examining differences between multiple decoding attempts of the same PDU to locate the errors, and by selecting a most common state at the position of each error in the multiple attempts or by a use of redundancy encoding).

FIG. 5 shows an example of a process flow 500 that supports techniques for dynamically adjusting retransmission opportunities within a CIS in accordance with one or more aspects of the present disclosure. The process flow 500 may implement or be implemented to realize or facilitate aspects of the wireless communications system 100, the signaling diagram 200, the communication timeline 300, or the signaling diagram 400. For example, the process flow 500 illustrates communication between a host 505 (e.g., a host A), an initiating layer 510 (which may be equivalently referred to as an initiating link layer), a responding layer 515 (which may be equivalently referred to as a responding link layer), a host 520 (e.g., a host B), and a length hardening component 525 (which may be equivalently referred to as a length hardening sink or a length hardening function).

In the following description of the process flow 500, the operations may be performed (such as reported or provided) in a different order than the order shown, or the operations performed by the example devices may be performed in different orders or at different times. For example, specific operations also may be left out of the process flow 500, or other operations may be added to the process flow 500. Further, although some operations or signaling may be shown to occur at different times for discussion purposes, these operations may actually occur at the same time.

At 530, the host 505 and the initiating layer 510 may create a connected isochronous group (CIG), which may be referred to as or associated with a Step 1. The CIG may include one or more CISes. In some aspects, Step 1 may encompass the operations of 532 and 534.

At 532, as part of Step 1, the host 505 may transmit a CIG configuration message to the initiating layer 510. In some aspects, the CIG configuration message may be a host controller interface (HCI) LE Set CIG Parameters command. The CIG configuration message may set or configure one or more parameters that may affect audio quality and latency.

At 534, also as part of Step 1, the initiating layer 510 may transmit a command complete message to the host 505. In some aspects, the command complete message may be an HCI command complete message.

At 536, the host 505 and the initiating layer 510 may provide values for a set of, if not all, MCS rates, which may be referred to as or associated with a Step 2. For example, the host 505 and the initiating layer 510 may provide (Max_PDU, BN) values for all MCS rates. In some aspects, Step 2 may encompass the operations of 538 and 540.

At 538, as part of Step 2, the host 505 may transmit a BN mapping message to the initiating layer 510. In some aspects, the BN mapping message may be an HCI Set CIG MCS Map message, which may be a product- or manufacturer-specific message or otherwise convey product- or manufacturer-specific parameters.

At 540, also as part of Step 2, the initiating layer 510 may transmit a command complete message. In some aspects, the command complete message may be an HCI command complete message.

At 542, the host 505, the initiating layer 510, the responding layer 515, and the host 520 may create a first CIS in the CIG, which may be referred to as or associated with a Step 3. In some aspects, Step 3 may encompass the operations of 544 through 562.

At 544, the host 505 may transmit a create CIS message to the initiating layer 510. In some aspects, the create CIS message may be an HCI LE Create CIS message.

At 546, the initiating layer 510 may transmit a command status message to the host 505. In some aspects, the command status message may be an HCI command status message.

At 548, the initiating layer 510 may transmit a link layer CIS REQ message to the responding layer 515. In some aspects, the CIS request message may be a product- or manufacturer-specific link layer CIS request message.

At 550, the responding layer 515 may transmit a CIS request message to the host 520. In some aspects, the CIS request message may be an HCI LE CIS Request message.

At 552, the host 520 may transmit an accept CIS request message to the responding layer 515. The accept CIS request message may be an HCI LE Accept CIS request message.

At 554, the responding layer 515 may transmit a command status message to the host 520. In some aspects, the command status message may be an HCI command status message.

At 556, the responding layer 515 may transmit a CIS response message to the initiating layer 510. In some aspects, the CIS response message may be a link layer CIS_RSP message.

At 558, the initiating layer 510 may transmit a CIS indication message to the responding layer 515. In some aspects, the CIS indication message may be a link layer CIS_IND message.

At 560, the host 505 may transmit a CIS established indication to the host 505. In some aspects, the CIS established indication may be an HCI LE CIS Established message.

At 562, the responding layer 515 may transmit a CIS established indication to the host 520. In some aspects, the CIS established indication may be an HCI LE CIS Established message.

Figure 6:
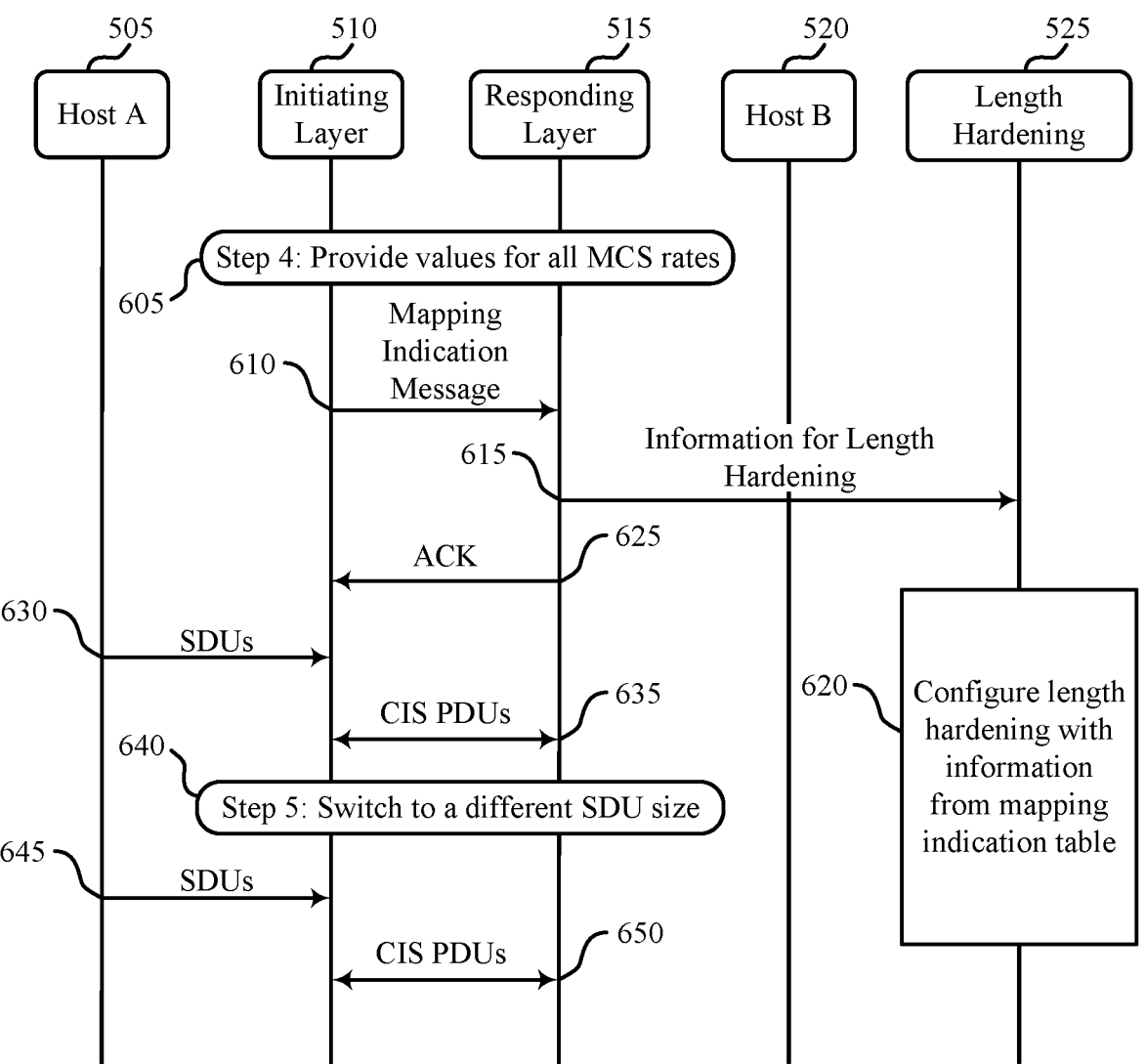

FIG. 6 shows an example of a process flow 600 that supports techniques for dynamically adjusting retransmission opportunities within a CIS in accordance with one or more aspects of the present disclosure. The process flow 600 may implement or be implemented to realize or facilitate aspects of the wireless communications system 100, the signaling diagram 200, the communication timeline 300, or the signaling diagram 400.

In some aspects, the process flow 600 may be a continuation or an extension of the process flow 500 (e.g., operations of 605 may immediately follow operations of 562). For example, the process flow 500 may illustrate Steps 1, 2, and 3 and the process flow 600 may illustrate Steps 4 and 5. Likewise, the process flow 600 illustrates communication between the host 505 (e.g., a host A), the initiating layer 510

(which may be equivalently referred to as an initiating link layer), the responding layer 515 (which may be equivalently referred to as a responding link layer), the host 520 (e.g., a host B), and the length hardening component 525 (which may be equivalently referred to as a length hardening sink or a length hardening function). Together, the process flow 500 and the process flow 600 may illustrate an extended CIS BN update procedure (e.g., a setup and/or update of a CIS via a mapping indication message, such as the mapping indication message 435).

In the following description of the process flow 600, the operations may be performed (such as reported or provided) in a different order than the order shown, or the operations performed by the example devices may be performed in different orders or at different times. For example, specific operations also may be left out of the process flow 600, or other operations may be added to the process flow 600. Further, although some operations or signaling may be shown to occur at different times for discussion purposes, these operations may actually occur at the same time.

At 605, the initiating layer 510 and the responding layer 515 may provide values for a set of, if not all, MCS rates, which may be referred to as or associated with a Step 4. For example, the initiating layer 510 and the responding layer 515 may provide, negotiate, or indicate (Max_PDU, BN) values for all MCS rates. In some aspects, Step 4 may encompass the operations of 610 through 635.

At 610, the initiating layer 510 may transmit a mapping indication message to the responding layer 515. In some aspects, the mapping indication message may be a product- or manufacturer-specific mapping indication message. The mapping indication message may be an example of the mapping indication message 435 as illustrated by and described with reference to FIG. 4. In some implementations, a table indicating a correspondence between BN values and MCS rates may be sent or indicated via the mapping indication message 435, and the table may be updated and synchronized on both sides (e.g., at both the host 505 and the host 520) by an ISO_Interval event count. As such, the host 505 and the host 520 may maintain a same understanding of the BN-MCS mapping table to be used by tracking and incrementing an ISO_Interval event count and synchronizing changes in the BN-MCS mapping table to the ISO_Interval event count. For example, the host 505 and the host 520 may update the table every X ISO_Interval events, where X may be static or varying and may be any integer including 1, 2, 3, 4, and so on.

At 615, the responding layer 515 may transmit information for length hardening to the length hardening component 525 (e.g., via the host 520).

At 620, the length hardening component 525 may configure the length hardening with the information from the table indicated by the mapping indication message, as described in more detail with reference to FIG. 4.

At 625, the responding layer 515 may transmit an ACK to the initiating layer 510 responsive to the mapping indication message. In some aspects, the ACK may be a link layer ACK.

At 630, the host 505 may transmit one or more SDUs corresponding to a first MCS to the initiating layer 510.

At 635, the initiating layer 510 and the responding layer 515 may exchange one or more CIS PDUs, corresponding to the one or more SDUs provided at 630, using the first MCS.

At 640, the initiating layer 510 and the responding layer 515 may switch to a different SDU size, which may be referred to as or associated with a Step 5. In some aspects, Step 5 may encompass the operations of 645 and 650.

At 645, the host 505 may transmit one or more SDUs corresponding to a second MCS to the initiating layer 510.

At 650, the initiating layer 510 and the responding layer 515 may exchange one or more CIS PDUs, corresponding to the one or more SDUs provided at 645, using the second MCS. In some implementations, the initiating layer 510 and the responding layer 515 may dynamically update one or more parameters that influence how many transmission opportunities are available for retransmissions in accordance with switching from the first MCS to the second MCS. For example, the initiating layer 510 and the responding layer 515 may increase the number of transmission opportunities that may be used for retransmissions as MCS decreases (e.g., as a link quality deteriorates) and may decrease the number of transmission opportunities that may be used for retransmissions as MCS increases (e.g., as a link quality improves).

Figure 7:
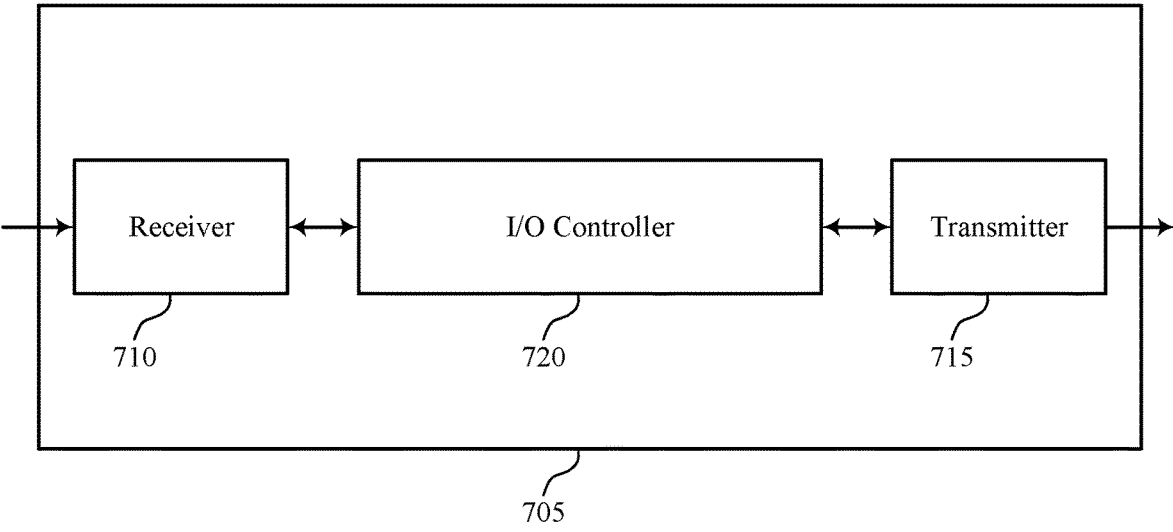
FIGS. 7 and 8 show block diagrams of devices that support techniques for dynamically adjusting retransmission opportunities within a CIS in accordance with one or more aspects of the present disclosure.

FIG. 7 shows a block diagram 700 of a device 705 that supports techniques for dynamically adjusting retransmission opportunities within a CIS in accordance with one or more aspects of the present disclosure. The device 705 may be an example of aspects of a Bluetooth Device as described herein. The device 705 may include a receiver 710, a transmitter 715, and an I/O controller 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to techniques for dynamically adjusting retransmission opportunities within a CIS). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to techniques for dynamically adjusting retransmission opportunities within a CIS). In some examples, the transmitter 715 may be co-located with a receiver 710 in a transceiver module. The transmitter 715 may utilize a single antenna or a set of multiple antennas.

The I/O controller 720, the receiver 710, the transmitter 715, or various combinations thereof or various components thereof may be examples of means for performing various aspects of techniques for dynamically adjusting retransmission opportunities within a CIS as described herein. For example, the I/O controller 720, the receiver 710, the transmitter 715, or various combinations or components thereof may support a method for performing one or more of the functions described herein.

In some examples, the I/O controller 720, the receiver 710, the transmitter 715, or various combinations or components thereof may be implemented in hardware (e.g., in communications management circuitry). The hardware may include a processor, a DSP, a CPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the I/O controller 720, the receiver 710, the transmitter 715, or various combinations or components thereof may be implemented in code (e.g., as communications management software or firmware) executed by a processor. If implemented in code executed by a processor, the functions of the I/O controller 720, the receiver 710, the transmitter 715, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the I/O controller 720 may be configured to perform various operations (e.g., receiving, obtaining, monitoring, outputting, transmitting) using or otherwise in cooperation with the receiver 710, the transmitter 715, or both. For example, the I/O controller 720 may receive information from the receiver 710, send information to the transmitter 715, or be integrated in combination with the receiver 710, the transmitter 715, or both to obtain information, output information, or perform various other operations as described herein.

The I/O controller 720 may support wireless communication at a first wireless device in accordance with examples as disclosed herein. For example, the I/O controller 720 may be configured as or otherwise support a means for transmitting or receiving a control message that indicates a mapping between a respective number of transmission opportunities that are allocated for retransmissions via a CIS and a respective MCS of the CIS. The I/O controller 720 may be configured as or otherwise support a means for detecting a change to an MCS of the CIS during a first ISO interval of the CIS. The I/O controller 720 may be configured as or otherwise support a means for adjusting, for a second ISO interval of the CIS, a number of transmission opportunities that are allocated for the retransmissions in accordance with detecting the change to the MCS and the mapping, where the first ISO interval and the second ISO interval span a same time duration. The I/O controller 720 may be configured as or otherwise support a means for transmitting or receiving one or more audio data packets with a second wireless device during the second ISO interval in accordance with the adjusted number of transmission opportunities that are allocated for the retransmissions.

By including or configuring the I/O controller 720 in accordance with examples as described herein, the device 705 (e.g., a processor controlling or otherwise coupled with the receiver 710, the transmitter 715, the I/O controller 720, or a combination thereof) may support techniques for reduced processing, reduced power consumption, and more efficient utilization of communication resources.

Figure 8:
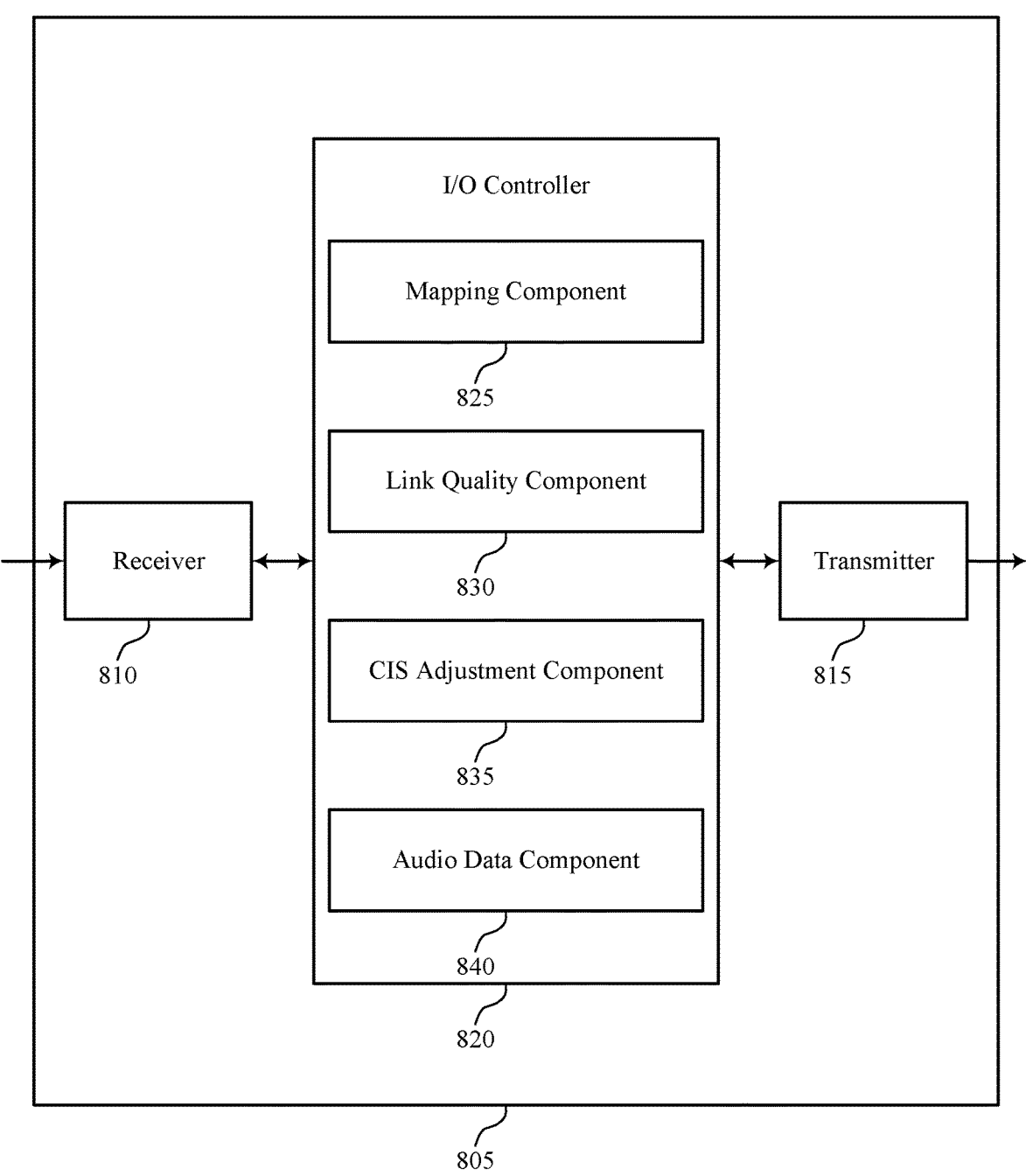

FIG. 8 shows a block diagram 800 of a device 805 that supports techniques for dynamically adjusting retransmission opportunities within a CIS in accordance with one or more aspects of the present disclosure. The device 805 may be an example of aspects of a device 705 or a paired device 115 as described herein. The device 805 may include a receiver 810, a transmitter 815, and an I/O controller 820. The device 805 may also include a processor. Each of these components may be in communication with one another (e.g., via one or more buses).

The receiver 810 may provide a means for receiving information such as packets, user data, control information, or any combination thereof associated with various information channels (e.g., control channels, data channels, information channels related to techniques for dynamically adjusting retransmission opportunities within a CIS). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to techniques for dynamically adjusting retransmission opportunities within a CIS). In some examples, the transmitter 815 may be co-located with a receiver 810 in a transceiver module. The transmitter 815 may utilize a single antenna or a set of multiple antennas.

The device 805, or various components thereof, may be an example of means for performing various aspects of techniques for dynamically adjusting retransmission opportunities within a CIS as described herein. For example, the I/O controller 820 may include a mapping component 825, a link quality component 830, a CIS adjustment component 835, an audio data component 840, or any combination thereof. The I/O controller 820 may be an example of aspects of a I/O controller 720 as described herein. In some examples, the I/O controller 820, or various components thereof, may be configured to perform various operations (e.g., receiving, obtaining, monitoring, outputting, transmitting) using or otherwise in cooperation with the receiver 810, the transmitter 815, or both. For example, the I/O controller 820 may receive information from the receiver 810, send information to the transmitter 815, or be integrated in combination with the receiver 810, the transmitter 815, or both to obtain information, output information, or perform various other operations as described herein.

The I/O controller 820 may support wireless communication at a first wireless device in accordance with examples as disclosed herein. The mapping component 825 may be configured as or otherwise support a means for transmitting or receiving a control message that indicates a mapping between a respective number of transmission opportunities that are allocated for retransmissions via a CIS and a respective MCS of the CIS. The link quality component 830 may be configured as or otherwise support a means for detecting a change to an MCS of the CIS during a first ISO interval of the CIS. The CIS adjustment component 835 may be configured as or otherwise support a means for adjusting, for a second ISO interval of the CIS, a number of transmission opportunities that are allocated for the retransmissions in accordance with detecting the change to the MCS and the mapping, where the first ISO interval and the second ISO interval span a same time duration. The audio data component 840 may be configured as or otherwise support a means for transmitting or receiving one or more audio data packets with a second wireless device during the second ISO interval in accordance with the adjusted number of transmission opportunities that are allocated for the retransmissions.

Figure 9:
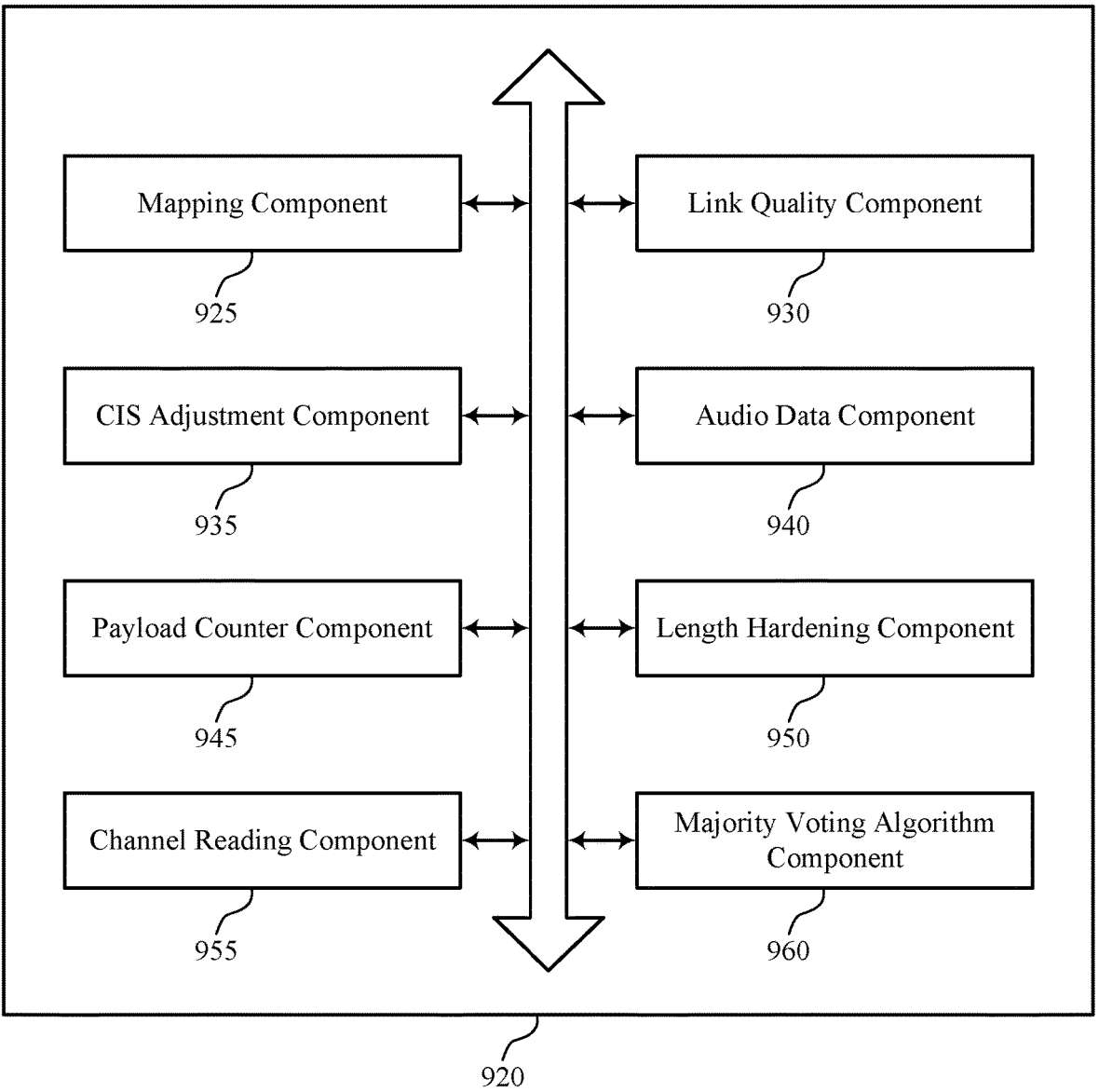
FIG. 9 shows a block diagram of an I/O controller that supports techniques for dynamically adjusting retransmission opportunities within a CIS in accordance with one or more aspects of the present disclosure.

FIG. 9 shows a block diagram 900 of an I/O controller 920 that supports techniques for dynamically adjusting retransmission opportunities within a CIS in accordance with one or more aspects of the present disclosure. The I/O controller 920 may be an example of aspects of an I/O controller 720, an I/O controller 820, or both, as described herein. The I/O controller 920, or various components thereof, may be an example of means for performing various aspects of techniques for dynamically adjusting retransmission opportunities within a CIS as described herein. For example, the I/O controller 920 may include a mapping component 925, a link quality component 930, a CIS adjustment component 935, an audio data component 940, a payload counter component 945, a length hardening component 950, a channel rating component 955, a majority voting algorithm component 960, or any combination thereof. Each of these components may communicate, directly or indirectly, with one another (e.g., via one or more buses).

The I/O controller 920 may support wireless communication at a first wireless device in accordance with examples as disclosed herein. The mapping component 925 may be configured as or otherwise support a means for transmitting or receiving a control message that indicates a mapping between a respective number of transmission opportunities that are allocated for retransmissions via a CIS and a respective MCS of the CIS. The link quality component 930 may be configured as or otherwise support a means for detecting a change to an MCS of the CIS during a first ISO interval of the CIS. The CIS adjustment component 935 may be configured as or otherwise support a means for adjusting, for a second ISO interval of the CIS, a number of transmission opportunities that are allocated for the retransmissions in accordance with detecting the change to the MCS and the mapping, where the first ISO interval and the second ISO interval span a same time duration. The audio data component 940 may be configured as or otherwise support a means for transmitting or receiving one or more audio data packets with a second wireless device during the second ISO interval in accordance with the adjusted number of transmission opportunities that are allocated for the retransmissions.

In some examples, to support adjusting the number of transmission opportunities that are allocated for the retransmissions, the CIS adjustment component 935 may be configured as or otherwise support a means for increasing the number of transmission opportunities that are allocated for the retransmissions as the MCS decreases from a relatively higher MCS to a relatively lower MCS. In some examples, to support adjusting the number of transmission opportunities that are allocated for the retransmissions, the CIS adjustment component 935 may be configured as or otherwise support a means for decreasing the number of transmission opportunities as the MCS increases from the relatively lower MCS to the relatively higher MCS.

In some examples, to support adjusting the number of transmission opportunities that are allocated for the retransmissions, the CIS adjustment component 935 may be configured as or otherwise support a means for decreasing a BN associated with the CIS as the MCS decreases from a relatively higher MCS to a relatively lower MCS, where decreasing the BN is associated with an increase to the number of transmission opportunities that are allocated for the retransmissions. In some examples, to support adjusting the number of transmission opportunities that are allocated for the retransmissions, the CIS adjustment component 935 may be configured as or otherwise support a means for increasing the BN associated with the CIS as the MCS increases from the relatively lower MCS to the relatively higher MCS, where increasing the BN is associated with a decrease to the number of transmission opportunities that are allocated for the retransmissions.

In some examples, to support adjusting the number of transmission opportunities that are allocated for the retransmissions, the CIS adjustment component 935 may be configured as or otherwise support a means for increasing an FT associated with the CIS as the MCS decreases from a relatively higher MCS to a relatively lower MCS, where increasing the FT is associated with an increase to the number of transmission opportunities that are allocated for the retransmissions. In some examples, to support adjusting the number of transmission opportunities that are allocated for the retransmissions, the CIS adjustment component 935 may be configured as or otherwise support a means for decreasing the FT associated with the CIS as the MCS increases from the relatively lower MCS to the relatively higher MCS, where decreasing the FT is associated with a decrease to the number of transmission opportunities that are allocated for the retransmissions.

In some examples, a BN associated with the CIS, an FT associated with the CIS, and a packet size are tuned for each MCS of a set of multiple MCSs. In some examples, the BN, the FT, and the packet size are dynamically changed in response to the change to the MCS.

In some examples, the payload counter component 945 may be configured as or otherwise support a means for incrementing a PDU sequence number by a fixed value after the first ISO interval, where the first ISO interval is associated with a first BN. In some examples, the payload counter component 945 may be configured as or otherwise support a means for incrementing the PDU sequence number by the fixed value after the second ISO interval, where the second ISO interval is associated with a second BN that is different from the first BN.

In some examples, the first wireless device increments the PDU sequence number by the fixed value after each ISO interval regardless of an actual BN associated with that ISO interval in accordance with adjusting the number of transmission opportunities that are allocated for the retransmissions across ISO intervals.

In some examples, the mapping indicates, for each MCS of a set of multiple MCSs, the respective number of transmission opportunities that are allocated for the retransmissions, timing information associated with an adjustment to the respective number of transmission opportunities that are allocated for the retransmissions, and a size of a PDU.

In some examples, the control message further indicates, for each MCS, a quantity of sub-events or a quantity of sub-intervals during an ISO interval.

In some examples, the length hardening component 950 may be configured as or otherwise support a means for indicating the size of the PDU for a length hardening function at the first wireless device. In some examples, the channel rating component 955 may be configured as or otherwise support a means for reading, at each transmission opportunity of an ISO interval, an amount of data equal to the size of the PDU in accordance with indicating the size of the PDU to the length hardening function such that each PDU received by the first wireless device has a same size, where the size of the PDU indicated to the length hardening function overrides a second size indicated by a header of the PDU.

In some examples, the majority voting algorithm component 960 may be configured as or otherwise support a means for processing two or more failed attempts to decode a single PDU using a majority voting algorithm, where the majority voting algorithm is associated with the size indicated to the length hardening function, and where the majority voting algorithm uses the size indicated to the length hardening function to correct the PDU if the majority voting algorithm detects a difference in a length field across the two or more failed attempts to decode the single PDU.

In some examples, the control message indicates the mapping between the respective number of transmission opportunities that are allocated for the retransmissions and the respective MCS for each of two different communication directions. In some examples, the mapping includes a first mapping for communications from a central device to a peripheral device and a second mapping for communications from the peripheral device to the central device.

In some examples, mapping entries associated with the second mapping have zero lengths when a backchannel link from the peripheral device to the central device is disabled and have non-zero lengths when the backchannel link from the peripheral device to the central device is enabled. In some examples, a transmission or reception of the control message dynamically enables or disables the backchannel link in accordance with whether the mapping entries associated with the second mapping have the zero lengths or the non-zero lengths.

In some examples, to support transmitting or receiving the one or more audio data packets during the second ISO interval, the audio data component 940 may be configured as or otherwise support a means for transmitting, to the second wireless device, the one or more audio data packets and a potential set of one or more retransmissions of the one or more audio data packets in accordance with the number of transmission opportunities that are allocated for the retransmissions, where the first wireless device is configured as a transmitting device and the second wireless device is configured as a receiving device.

In some examples, to support transmitting or receiving the one or more audio data packets during the second ISO interval, the audio data component 940 may be configured as or otherwise support a means for receiving, from the second wireless device, the one or more audio data packets and a potential set of one or more retransmissions of the one or more audio data packets in accordance with the number of transmission opportunities that are allocated for the retransmissions, where the first wireless device is configured as a receiving device and the second wireless device is configured as a transmitting device.

Figure 10:
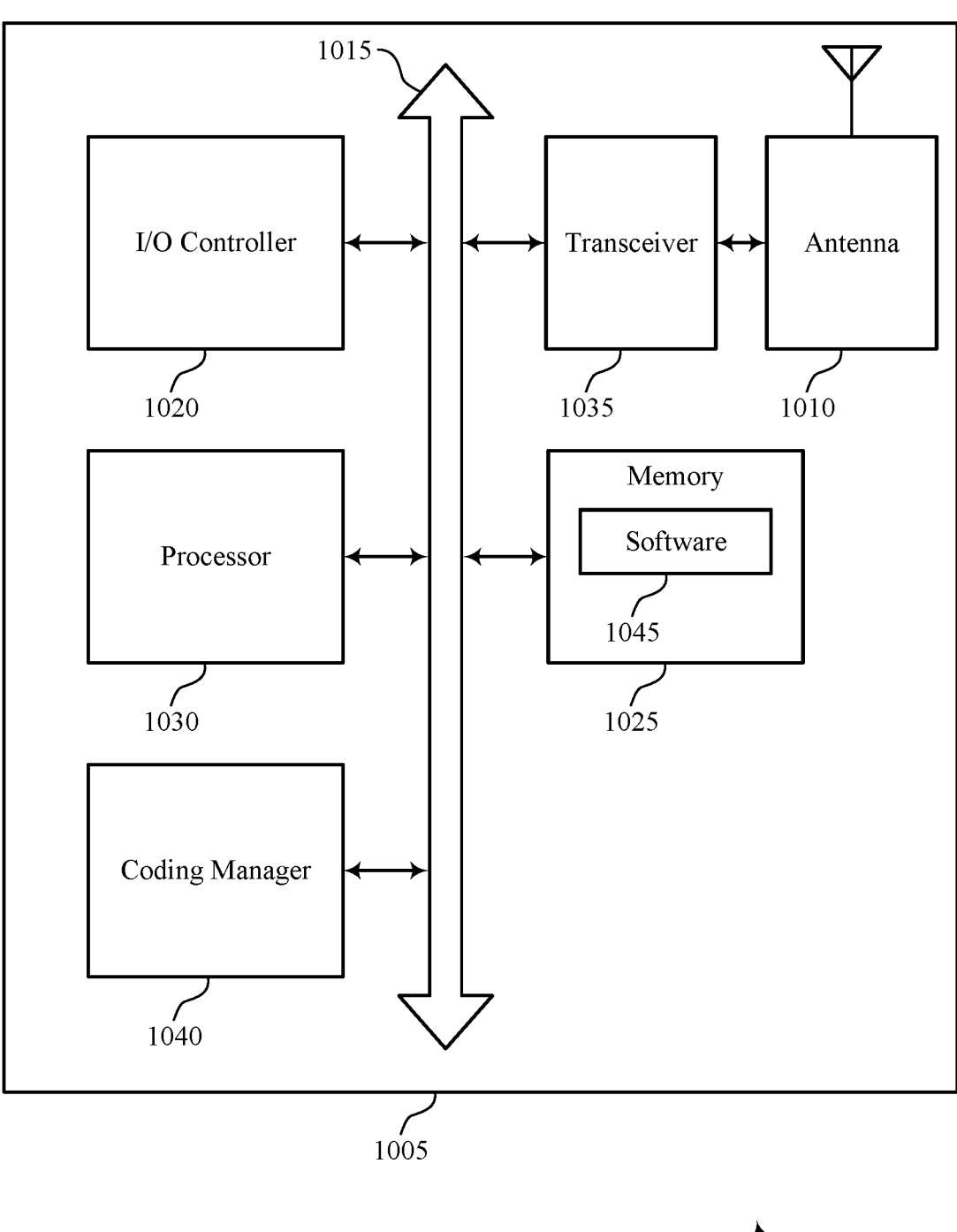
FIG. 10 shows a diagram of a system including a device that supports techniques for dynamically adjusting retransmission opportunities within a CIS in accordance with one or more aspects of the present disclosure.

FIG. 10 shows a diagram of a system 1000 including a device 1005 that supports techniques for dynamically adjusting retransmission opportunities within a CIS in accordance with one or more aspects of the present disclosure. The device 1005 may be an example of or include the components of a device 705, a device 805, or a Bluetooth Device as described herein. The device 1005 may include components for bi-directional voice and data communications including components for transmitting and receiving communications, such as an I/O controller 1020, an antenna 1010, a memory 1025, a processor 1030, a transceiver 1035, a coding manager 1040, and a software 1045. These components may be in electronic communication or otherwise coupled (e.g., operatively, communicatively, functionally, electronically, electrically) via one or more buses (e.g., a bus 1015).

The memory 1025 may include random-access memory (RAM) and read-only memory (ROM). The memory 1025 may store computer-readable, computer-executable software 1045 including instructions that, when executed by the processor 1030, cause the device 1005 to perform various functions described herein. The software 1045 may be stored in a non-transitory computer-readable medium such as system memory or other type of memory. In some cases, the software 1045 may not be directly executable by the processor 1030 but may cause a computer (e.g., when compiled and executed) to perform functions described herein. In some cases, the memory 1025 may contain, among other things, a BIOS which may control basic hardware or software operation such as the interaction with peripheral components or devices.

The processor 1030 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1030 may be configured to operate a memory array using a memory controller. In some other cases, a memory controller may be integrated into the processor 1030. The processor 1030 may be configured to execute computer-readable instructions stored in a memory (e.g., the memory 1025) to cause the device 1005 to perform various functions (e.g., functions or tasks supporting techniques for dynamically adjusting retransmission opportunities within a CIS). For example, the device 1005 or a component of the device 1005 may include a processor 1030 and memory 1025 coupled with or to the processor 1030, the processor 1030 and memory 1025 configured to perform various functions described herein.

In some cases, the device 1005 may include a single antenna 1010. However, in some other cases the device 1005 may have more than one antenna 1010, which may be capable of concurrently transmitting or receiving multiple wireless transmissions. The transceiver 1035 may communicate bi-directionally, via the one or more antennas 1010, wired, or wireless links as described herein. For example, the transceiver 1035 may represent a wireless transceiver and may communicate bi-directionally with another wireless transceiver. The transceiver 1035 may also include a modem to modulate the packets and provide the modulated packets to one or more antennas 1010 for transmission, and to demodulate packets received from the one or more antennas 1010. The transceiver 1035, or the transceiver 1035 and one or more antennas 1010, may be an example of a transmitter 715, a transmitter 815, a receiver 710, a receiver 810, or any combination thereof or component thereof, as described herein.

The software 1045 may include instructions to implement aspects of the present disclosure, including instructions to support techniques for dynamically adjusting retransmission opportunities within a CIS. The software 1045 may be stored in a non-transitory computer-readable medium such as system memory or other type of memory. In some cases, the software 1045 may not be directly executable by the processor 1030 but may cause a computer (e.g., when compiled and executed) to perform functions described herein.

The I/O controller 1020 may support wireless communication at a first wireless device in accordance with examples as disclosed herein. For example, the I/O controller 1020 may be configured as or otherwise support a means for transmitting or receiving a control message that indicates a mapping between a respective number of transmission opportunities that are allocated for retransmissions via a CIS and a respective MCS of the CIS. The I/O controller 1020 may be configured as or otherwise support a means for detecting a change to an MCS of the CIS during a first ISO interval of the CIS. The I/O controller 1020 may be configured as or otherwise support a means for adjusting, for a second ISO interval of the CIS, a number of transmission opportunities that are allocated for the retransmissions in accordance with detecting the change to the MCS and the mapping, where the first ISO interval and the second ISO interval span a same time duration. The I/O controller 1020 may be configured as or otherwise support a means for transmitting or receiving one or more audio data packets with a second wireless device during the second ISO interval in accordance with the adjusted number of transmission opportunities that are allocated for the retransmissions.

By including or configuring the I/O controller 1020 in accordance with examples as described herein, the device 1005 may support techniques for improved communication reliability, reduced latency, improved user experience related to reduced processing, reduced power consumption, more efficient utilization of communication resources, improved coordination between devices, longer battery life, and improved utilization of processing capability.

I/O controller 1020 may manage input and output signals for the device 1005. I/O controller 1020 may also manage peripherals not integrated into the device 1005. In some cases, I/O controller 1020 may represent a physical connection or port to an external peripheral. In some cases, I/O controller 1020 may utilize an operating system such as iOS®, ANDROID®, MS-DOS®, MS-WINDOWS®, OS/2®, UNIX®, LINUX®, or another known operating system. In other cases, I/O controller 1020 may represent or interact with a modem, a keyboard, a mouse, a touchscreen, or a similar device. In some cases, I/O controller 1020 may be implemented as part of a processor, such as the processor 1030. In some cases, a user may interact with the device 1005 via I/O controller 1020 or via hardware components controlled by I/O controller 1020.

FIG. 11 shows a flowchart illustrating a method 1100 that supports techniques for dynamically adjusting retransmission opportunities within a CIS in accordance with one or more aspects of the present disclosure. The operations of the method 1100 may be implemented by a Bluetooth Device or its components as described herein. For example, the operations of the method 1100 may be performed by a Bluetooth Device as described with reference to FIGS. 1 through 10. In some examples, a Bluetooth Device may execute a set of instructions to control the functional elements of the Bluetooth Device to perform the described functions. Additionally, or alternatively, the Bluetooth Device may perform aspects of the described functions using special-purpose hardware.

At 1105, the method may include transmitting or receiving a control message that indicates a mapping between a respective number of transmission opportunities that are allocated for retransmissions via a CIS and a respective MCS of the CIS. The operations of 1105 may be performed in accordance with examples as disclosed herein. In some examples, aspects of the operations of 1105 may be performed by a mapping component 925 as described with reference to FIG. 9.

At 1110, the method may include detecting a change to an MCS of the CIS during a first ISO interval of the CIS. The operations of 1110 may be performed in accordance with examples as disclosed herein. In some examples, aspects of the operations of 1110 may be performed by a link quality component 930 as described with reference to FIG. 9.

At 1115, the method may include adjusting, for a second ISO interval of the CIS, a number of transmission opportunities that are allocated for the retransmissions in accordance with detecting the change to the MCS and the mapping, where the first ISO interval and the second ISO interval span a same time duration. The operations of 1115 may be performed in accordance with examples as disclosed herein. In some examples, aspects of the operations of 1115 may be performed by a CIS adjustment component 935 as described with reference to FIG. 9.

At 1120, the method may include transmitting or receiving one or more audio data packets with a second wireless device during the second ISO interval in accordance with the adjusted number of transmission opportunities that are allocated for the retransmissions. The operations of 1120 may be performed in accordance with examples as disclosed herein. In some examples, aspects of the operations of 1120 may be performed by an audio data component 940 as described with reference to FIG. 9.

The following provides an overview of aspects of the present disclosure:

Aspect 1: A method for wireless communication at a first wireless device, comprising: transmitting or receiving a control message that indicates a mapping between a respective number of transmission opportunities that are allocated for retransmissions via a CIS and a respective MCS of the CIS; detecting a change to a MCS of the CIS during a first ISO interval of the CIS; adjusting, for a second ISO interval of the CIS, a number of transmission opportunities that are allocated for the retransmissions in accordance with detecting the change to the MCS and the mapping, wherein the first ISO interval and the second ISO interval span a same time duration; and transmitting or receiving one or more audio data packets with a second wireless device during the second ISO interval in accordance with the adjusted number of transmission opportunities that are allocated for the retransmissions.

Aspect 2: The method of aspect 1, wherein adjusting the number of transmission opportunities that are allocated for the retransmissions comprises: increasing the number of transmission opportunities that are allocated for the retransmissions as the MCS decreases from a relatively higher MCS to a relatively lower MCS; and decreasing the number of transmission opportunities as the MCS increases from the relatively lower MCS to the relatively higher MCS.

Aspect 3: The method of any of aspects 1 through 2, wherein adjusting the number of transmission opportunities that are allocated for the retransmissions comprises: decreasing a BN associated with the CIS as the MCS decreases from a relatively higher MCS to a relatively lower MCS, wherein decreasing the BN is associated with an increase to the number of transmission opportunities that are allocated for the retransmissions; and increasing the BN associated with the CIS as the MCS increases from the relatively lower MCS to the relatively higher MCS, wherein increasing the BN is associated with a decrease to the number of transmission opportunities that are allocated for the retransmissions.

Aspect 4: The method of any of aspects 1 through 3, wherein adjusting the number of transmission opportunities that are allocated for the retransmissions comprises: increasing an FT associated with the CIS as the MCS decreases from a relatively higher MCS to a relatively lower MCS, wherein increasing the FT is associated with an increase to the number of transmission opportunities that are allocated for the retransmissions; and decreasing the FT associated with the CIS as the MCS increases from the relatively lower MCS to the relatively higher MCS, wherein decreasing the FT is associated with a decrease to the number of transmission opportunities that are allocated for the retransmissions.

Aspect 5: The method of any of aspects 1 through 4, wherein a BN associated with the CIS, an FT associated with the CIS, and a packet size are tuned for each MCS of a plurality of MCSs, and the BN, the FT, and the packet size are dynamically changed in response to the change to the MCS.

Aspect 6: The method of any of aspects 1 through 5, further comprising: incrementing a PDU sequence number by a fixed value after the first ISO interval, wherein the first ISO interval is associated with a first BN; and incrementing the PDU sequence number by the fixed value after the second ISO interval, wherein the second ISO interval is associated with a second BN that is different from the first BN.

Aspect 7: The method of aspect 6, wherein the first wireless device increments the PDU sequence number by the fixed value after each ISO interval regardless of an actual BN associated with that ISO interval in accordance with adjusting the number of transmission opportunities that are allocated for the retransmissions across ISO intervals.

Aspect 8: The method of any of aspects 1 through 7, wherein the mapping indicates, for each MCS of a plurality of MCSs, the respective number of transmission opportunities that are allocated for the retransmissions, timing information associated with an adjustment to the respective number of transmission opportunities that are allocated for the retransmissions, and a size of a PDU.

Aspect 9: The method of aspect 8, wherein the control message further indicates, for each MCS, a quantity of sub-events or a quantity of sub-intervals during an ISO interval.

Aspect 10: The method of any of aspects 8 through 9, further comprising: indicating the size of the PDU for a length hardening function at the first wireless device and the second wireless device; and reading, at each transmission opportunity of an ISO interval, an amount of data equal to the size of the PDU in accordance with indicating the size of the PDU to the length hardening function such that each PDU received by the first wireless device has a same size, wherein the size of the PDU indicated to the length hardening function overrides a second size indicated by a header of the PDU.

Aspect 11: The method of aspect 10, further comprising: processing two or more failed attempts to decode a single PDU using a majority voting algorithm, wherein the majority voting algorithm is associated with the size indicated to the length hardening function, and wherein the majority voting algorithm uses the size indicated to the length hardening function to correct the PDU if the majority voting algorithm detects a difference in a length field across the two or more failed attempts to decode the single PDU.

Aspect 12: The method of any of aspects 1 through 11, wherein the control message indicates the mapping between the respective number of transmission opportunities that are allocated for the retransmissions and the respective MCS for each of two different communication directions, the mapping includes a first mapping for communications from a central device to a peripheral device and a second mapping for communications from the peripheral device to the central device.

Aspect 13: The method of aspect 12, wherein mapping entries associated with the second mapping have a zero lengths when a backchannel link from the peripheral device to the central device is disabled and have non-zero lengths when the backchannel link from the peripheral device to the central device is enabled, and a transmission or reception of the control message dynamically enables or disables the backchannel link in accordance with whether the mapping entries associated with the second mapping have the zero lengths or the non-zero lengths.

Aspect 14: The method of any of aspects 1 through 13, wherein transmitting or receiving the one or more audio data packets during the second ISO interval comprises: transmitting, to the second wireless device, the one or more audio data packets and a potential set of one or more retransmissions of the one or more audio data packets in accordance with the number of transmission opportunities that are allocated for the retransmissions, wherein the first wireless device is configured as a transmitting device and the second wireless device is configured as a receiving device.

Aspect 15: The method of any of aspects 1 through 14, wherein transmitting or receiving the one or more audio data packets during the second ISO interval comprises: receiving, from the second wireless device, the one or more audio data packets and a potential set of one or more retransmissions of the one or more audio data packets in accordance with the number of transmission opportunities that are allocated for the retransmissions, wherein the first wireless device is configured as a receiving device and the second wireless device is configured as a transmitting device.

Aspect 16: An apparatus for wireless communication at a first wireless device, comprising a processor; memory coupled with the processor; and instructions stored in the memory and executable by the processor to cause the apparatus to perform a method of any of aspects 1 through 15.

Aspect 17: An apparatus for wireless communication at a first wireless device, comprising at least one means for performing a method of any of aspects 1 through 15.

Aspect 18: A non-transitory computer-readable medium storing code for wireless communication at a first wireless device, the code comprising instructions executable by a processor to perform a method of any of aspects 1 through 15.

It should be noted that the methods described herein describe possible implementations, and that the operations and the steps may be rearranged or otherwise modified and that other implementations are possible. Further, aspects from two or more of the methods may be combined.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. An apparatus for wireless communication at a first wireless device, comprising:
   one or more processors;
   one or more memories coupled with the one or more processors; and
   instructions stored in the one or more memories and executable by the one or more processors to cause the apparatus to:
   transmit or receive a control message that indicates a mapping between a respective number of transmission opportunities that are allocated for retransmissions via a connected isochronous stream and a respective modulation and coding scheme of the connected isochronous stream;
   detect a change to a modulation and coding scheme of the connected isochronous stream during a first isochronous interval of the connected isochronous stream;
   adjust, for a second isochronous interval of the connected isochronous stream, a ratio between first transmission opportunities that are allocated for the retransmissions and second transmission opportunities that are allocated for new transmissions in response to detecting the change to the modulation and coding scheme and the mapping, wherein the first isochronous interval and the second isochronous interval span a same time duration, and wherein the instructions to adjust the ratio are executable by the one or more processors to cause the apparatus to:
   increase a number of transmission opportunities that are allocated for the retransmissions as the modulation and coding scheme decreases from a relatively higher modulation and coding scheme to a relatively lower modulation and coding scheme; and
   decrease the number of transmission opportunities as the modulation and coding scheme increases from the relatively lower modulation and coding scheme to the relatively higher modulation and coding scheme; and
   transmit or receive one or more audio data packets with a second wireless device during the second isochronous interval in accordance with the adjusted ratio between the first transmission opportunities that are allocated for the retransmissions and the second transmission opportunities that are allocated for the new transmissions.

2. The apparatus of claim 1, wherein the instructions to adjust the ratio are executable by the one or more processors to cause the apparatus to:

decrease a burst number associated with the connected isochronous stream as the modulation and coding scheme decreases from the relatively higher modulation and coding scheme to the relatively lower modulation and coding scheme, wherein decreasing the burst number is associated with an increase to the number of transmission opportunities that are allocated for the retransmissions; and increase the burst number associated with the connected isochronous stream as the modulation and coding scheme increases from the relatively lower modulation and coding scheme to the relatively higher modulation and coding scheme, wherein increasing the burst number is associated with a decrease to the number of transmission opportunities that are allocated for the retransmissions, wherein the burst number is inversely proportional to a quantity of the first transmission opportunities that are allocated for the retransmissions.

3. The apparatus of claim 1, wherein the instructions to adjust the ratio are executable by the one or more processors to cause the apparatus to:

increase a flush timeout associated with the connected isochronous stream as the modulation and coding scheme decreases from the relatively higher modulation and coding scheme to the relatively lower modulation and coding scheme, wherein increasing the flush timeout is associated with an increase to the number of transmission opportunities that are allocated for the retransmissions; and decrease the flush timeout associated with the connected isochronous stream as the modulation and coding scheme increases from the relatively lower modulation and coding scheme to the relatively higher modulation and coding scheme, wherein decreasing the flush timeout is associated with a decrease to the number of transmission opportunities that are allocated for the retransmissions, wherein the flush timeout is proportional to a quantity of the first transmission opportunities that are allocated for the new transmissions.

4. The apparatus of claim 1, wherein:

a burst number associated with the connected isochronous stream, a flush timeout associated with the connected isochronous stream, and a packet size are tuned for each modulation and coding scheme of a plurality of modulation and coding schemes, and the burst number, the flush timeout, and the packet size are dynamically changed in response to the change to the modulation and coding scheme.

5. The apparatus of claim 1, wherein the instructions are further executable by the one or more processors to cause the apparatus to:

increment a protocol data unit sequence number by a fixed value after the first isochronous interval, wherein the first isochronous interval is associated with a first burst number; and increment the protocol data unit sequence number by the fixed value after the second isochronous interval, wherein the second isochronous interval is associated with a second burst number that is different from the first burst number.

6. The apparatus of claim 5, wherein the first wireless device increments the protocol data unit sequence number by the fixed value after each isochronous interval regardless of an actual burst number associated with that isochronous interval in accordance with adjusting the ratio between the first transmission opportunities that are allocated for the retransmissions and the second transmission opportunities that are allocated for the new transmissions across isochronous intervals.

7. The apparatus of claim 1, wherein the mapping indicates, for each modulation and coding scheme of a plurality of modulation and coding schemes, the respective number of transmission opportunities that are allocated for the retransmissions, timing information associated with an adjustment to the respective number of transmission opportunities that are allocated for the retransmissions, and a size of a protocol data unit.

8. The apparatus of claim 7, wherein the control message further indicates, for each modulation and coding scheme, a quantity of sub-events or a quantity of sub-intervals during an isochronous interval.

9. The apparatus of claim 7, wherein the instructions are further executable by the one or more processors to cause the apparatus to:

indicate the size of the protocol data unit for a length hardening function at the first wireless device; and read, at each transmission opportunity of an isochronous interval, an amount of data equal to the size of the protocol data unit in accordance with indicating the size of the protocol data unit to the length hardening function such that each protocol data unit received by the first wireless device has a same size, wherein the size of the protocol data unit indicated to the length hardening function overrides a second size indicated by a header of the protocol data unit.

10. The apparatus of claim 9, wherein the instructions are further executable by the one or more processors to cause the apparatus to:

process two or more failed attempts to decode a single protocol data unit using a majority voting algorithm, wherein the majority voting algorithm is associated with the size indicated to the length hardening function, and wherein the majority voting algorithm uses the size indicated to the length hardening function to correct the protocol data unit if the majority voting algorithm detects a difference in a length field across the two or more failed attempts to decode the single protocol data unit.

11. The apparatus of claim 1, wherein the control message indicates the mapping between the respective number of transmission opportunities that are allocated for the retransmissions and the respective modulation and coding scheme for each of two different communication directions, and wherein the mapping includes a first mapping for communications from a central device to a peripheral device and a second mapping for communications from the peripheral device to the central device.

12. The apparatus of claim 11, wherein mapping entries associated with the second mapping have zero lengths when a backchannel link from the peripheral device to the central device is disabled and have non-zero lengths when the backchannel link from the peripheral device to the central device is enabled, and wherein a transmission or reception of the control message dynamically enables or disables the backchannel link in accordance with whether the mapping entries associated with the second mapping have the zero lengths or the non-zero lengths.

13. The apparatus of claim 1, wherein the instructions to transmit or receive the one or more audio data packets during the second isochronous interval are executable by the one or more processors to cause the apparatus to:

transmit, to the second wireless device, the one or more audio data packets and a potential set of one or more retransmissions of the one or more audio data packets in accordance with the ratio between the first transmission opportunities that are allocated for the retransmissions and the second transmission opportunities that are allocated for the new transmissions, wherein the first wireless device is configured as a transmitting device and the second wireless device is configured as a receiving device.

14. The apparatus of claim 1, wherein the instructions to transmit or receive the one or more audio data packets during the second isochronous interval are executable by the one or more processors to cause the apparatus to:

receive, from the second wireless device, the one or more audio data packets and a potential set of one or more retransmissions of the one or more audio data packets in accordance with the ratio between the first transmission opportunities that are allocated for the retransmissions and the second transmission opportunities that are allocated for the new transmissions, wherein the first wireless device is configured as a receiving device and the second wireless device is configured as a transmitting device.

15. A method for wireless communication at a first wireless device, comprising:

transmitting or receiving a control message that indicates a mapping between a respective number of transmission opportunities that are allocated for retransmissions via a connected isochronous stream and a respective modulation and coding scheme of the connected isochronous stream;

detecting a change to a modulation and coding scheme of the connected isochronous stream during a first isochronous interval of the connected isochronous stream;

adjusting, for a second isochronous interval of the connected isochronous stream, a ratio between first transmission opportunities that are allocated for the retransmissions and second transmission opportunities that are allocated for new transmissions in response to detecting the change to the modulation and coding scheme and the mapping, wherein the first isochronous interval and the second isochronous interval span a same time duration, and wherein adjusting the ratio comprises:

increasing a number of transmission opportunities that are allocated for the retransmissions as the modulation and coding scheme decreases from a relatively higher modulation and coding scheme to a relatively lower modulation and coding scheme; and decreasing the number of transmission opportunities as the modulation and coding scheme increases from the relatively lower modulation and coding scheme to the relatively higher modulation and coding scheme; and transmitting or receiving one or more audio data packets with a second wireless device during the second isochronous interval in accordance with the adjusted ratio between the first transmission opportunities that are allocated for the retransmissions and the second transmission opportunities that are allocated for the new transmissions.

16. The method of claim 15, wherein adjusting the ratio comprises:

decreasing a burst number associated with the connected isochronous stream as the modulation and coding scheme decreases from the relatively higher modulation and coding scheme to the relatively lower modulation and coding scheme, wherein decreasing the burst number is associated with an increase to the number of transmission opportunities that are allocated for the retransmissions; and increasing the burst number associated with the connected isochronous stream as the modulation and coding scheme increases from the relatively lower modulation and coding scheme to the relatively higher modulation and coding scheme, wherein increasing the burst number is associated with a decrease to the number of transmission opportunities that are allocated for the retransmissions, wherein the burst number is inversely proportional to a quantity of the first transmission opportunities that are allocated for the retransmissions.

17. The method of claim 15, wherein adjusting the ratio comprises:

increasing a flush timeout associated with the connected isochronous stream as the modulation and coding scheme decreases from the relatively higher modulation and coding scheme to the relatively lower modulation and coding scheme, wherein increasing the flush timeout is associated with an increase to the number of transmission opportunities that are allocated for the retransmissions; and decreasing the flush timeout associated with the connected isochronous stream as the modulation and coding scheme increases from the relatively lower modulation and coding scheme to the relatively higher modulation and coding scheme, wherein decreasing the flush timeout is associated with a decrease to the number of transmission opportunities that are allocated for the retransmissions, wherein the flush timeout is proportional to a quantity of the first transmission opportunities that are allocated for the new transmissions.

18. The method of claim 15, wherein a burst number associated with the connected isochronous stream, a flush timeout associated with the connected isochronous stream, and a packet size are tuned for each modulation and coding scheme of a plurality of modulation and coding schemes, and wherein the burst number, the flush timeout, and the packet size are dynamically changed in response to the change to the modulation and coding scheme.

19. The method of claim 15, further comprising:

incrementing a protocol data unit sequence number by a fixed value after the first isochronous interval, wherein the first isochronous interval is associated with a first burst number; and incrementing the protocol data unit sequence number by the fixed value after the second isochronous interval, wherein the second isochronous interval is associated with a second burst number that is different from the first burst number.

20. The method of claim 19, wherein the first wireless device increments the protocol data unit sequence number by the fixed value after each isochronous interval regardless of an actual burst number associated with that isochronous interval in accordance with adjusting the ratio between the first transmission opportunities that are allocated for the retransmissions and the second transmission opportunities that are allocated for the new transmissions across isochronous intervals.

21. The method of claim 15, wherein the mapping indicates, for each modulation and coding scheme of a plurality of modulation and coding schemes, the respective number of transmission opportunities that are allocated for the retransmissions, timing information associated with an adjustment to the respective number of transmission opportunities that are allocated for the retransmissions, and a size of a protocol data unit.

22. The method of claim 21, wherein the control message further indicates, for each modulation and coding scheme, a quantity of sub-events or a quantity of sub-intervals during an isochronous interval.

23. The method of claim 21, further comprising:
indicating the size of the protocol data unit for a length hardening function at the first wireless device; and
reading, at each transmission opportunity of an isochronous interval, an amount of data equal to the size of the protocol data unit in accordance with indicating the size of the protocol data unit to the length hardening function such that each protocol data unit received by the first wireless device has a same size, wherein the size of the protocol data unit indicated to the length hardening function overrides a second size indicated by a header of the protocol data unit.

24. The method of claim 23, further comprising:
processing two or more failed attempts to decode a single protocol data unit using a majority voting algorithm, wherein the majority voting algorithm is associated with the size indicated to the length hardening function, and wherein the majority voting algorithm uses the size indicated to the length hardening function to correct the protocol data unit if the majority voting algorithm detects a difference in a length field across the two or more failed attempts to decode the single protocol data unit.

25. An apparatus for wireless communication at a first wireless device, comprising:
means for transmitting or receiving a control message that indicates a mapping between a respective number of transmission opportunities that are allocated for retransmissions via a connected isochronous stream and a respective modulation and coding scheme of the connected isochronous stream;
means for detecting a change to a modulation and coding scheme of the connected isochronous stream during a first isochronous interval of the connected isochronous stream;
means for adjusting, for a second isochronous interval of the connected isochronous stream, a ratio between first transmission opportunities that are allocated for the retransmissions and second transmission opportunities that are allocated for new transmissions in response to detecting the change to the modulation and coding scheme and the mapping, wherein the first isochronous interval and the second isochronous interval span a same time duration, and wherein the means for adjusting the ratio comprise:
means for increasing a number of transmission opportunities that are allocated for the retransmissions as the modulation and coding scheme decreases from a relatively higher modulation and coding scheme to a relatively lower modulation and coding scheme; and means for decreasing the number of transmission opportunities as the modulation and coding scheme increases from the relatively lower modulation and coding scheme to the relatively higher modulation and coding scheme; and
means for transmitting or receiving one or more audio data packets with a second wireless device during the second isochronous interval in accordance with the adjusted ratio between the first transmission opportunities that are allocated for the retransmissions and the second transmission opportunities that are allocated for the new transmissions.

26. The apparatus of claim 25, wherein the means for adjusting the ratio comprise:
means for decreasing a burst number associated with the connected isochronous stream as the modulation and coding scheme decreases from the relatively higher modulation and coding scheme to the relatively lower modulation and coding scheme, wherein decreasing the burst number is associated with an increase to the number of transmission opportunities that are allocated for the retransmissions; and
means for increasing the burst number associated with the connected isochronous stream as the modulation and coding scheme increases from the relatively lower modulation and coding scheme to the relatively higher modulation and coding scheme, wherein increasing the burst number is associated with a decrease to the number of transmission opportunities that are allocated for the retransmissions,
wherein the burst number is inversely proportional to a quantity of the first transmission opportunities that are allocated for the retransmissions.

27. A non-transitory computer-readable medium storing code for wireless communication at a first wireless device, the code comprising instructions executable by one or more processors to:
transmit or receive a control message that indicates a mapping between a respective number of transmission opportunities that are allocated for retransmissions via a connected isochronous stream and a respective modulation and coding scheme of the connected isochronous stream;
detect a change to a modulation and coding scheme of the connected isochronous stream during a first isochronous interval of the connected isochronous stream;
adjust, for a second isochronous interval of the connected isochronous stream, a ratio between first transmission opportunities that are allocated for the retransmissions and second transmission opportunities that are allocated for new transmissions in response to detecting the change to the modulation and coding scheme and the mapping, wherein the first isochronous interval and the second isochronous interval span a same time duration, and wherein the code to adjust the ratio is executable by the one or more processors to cause the first wireless device to:
increase a number of transmission opportunities that are allocated for the retransmissions as the modulation and coding scheme decreases from a relatively higher modulation and coding scheme to a relatively lower modulation and coding scheme; and
decrease the number of transmission opportunities as the modulation and coding scheme increases from the relatively lower modulation and coding scheme to the relatively higher modulation and coding scheme; and transmit or receive one or more audio data packets with a second wireless device during the second isochronous interval in accordance with the adjusted ratio between the first transmission opportunities that are allocated for the retransmissions and the second transmission opportunities that are allocated for the new transmissions.

\*    \*    \*    \*    \*